(12) United States Patent
Treat

(10) Patent No.: US 11,104,775 B2
(45) Date of Patent: Aug. 31, 2021

(54) CONTROLLED POLYMER FOAMING USING A HYBRID NUCLEATING AGENT FORMED FROM A MINERAL AND AN ORGANIC NUCLEATING AGENT

(71) Applicant: IMERYS TALC AMERICA, INC., Roswell, GA (US)

(72) Inventor: Neil Treat, San Jose, CA (US)

(73) Assignee: Imerys Talc America, Inc., Roswell, GA (US)

( * ) Notice: Subject to any disclaimer, the term of this patent is extended or adjusted under 35 U.S.C. 154(b) by 228 days.

(21) Appl. No.: 16/097,379

(22) PCT Filed: Mar. 22, 2017

(86) PCT No.: PCT/US2017/023621
§ 371 (c)(1),
(2) Date: Oct. 29, 2018

(87) PCT Pub. No.: WO2017/189128
PCT Pub. Date: Nov. 2, 2017

(65) Prior Publication Data
US 2019/0144627 A1    May 16, 2019

Related U.S. Application Data

(60) Provisional application No. 62/329,574, filed on Apr. 29, 2016.

(51) Int. Cl.
| | | |
|---|---|---|
| C08J 9/00 | (2006.01) | |
| C08K 3/01 | (2018.01) | |
| C08K 5/098 | (2006.01) | |
| C08J 9/12 | (2006.01) | |
| C08K 3/34 | (2006.01) | |
| C08K 9/04 | (2006.01) | |
| C08J 3/20 | (2006.01) | |

(52) U.S. Cl.
CPC ............ *C08J 9/0095* (2013.01); *C08J 3/201* (2013.01); *C08J 9/009* (2013.01); *C08J 9/0023* (2013.01); *C08J 9/0052* (2013.01); *C08J 9/0066* (2013.01); *C08J 9/122* (2013.01); *C08K 3/34* (2013.01); *C08K 5/098* (2013.01); *C08K 9/04* (2013.01); *C08J 2201/032* (2013.01); *C08J 2203/06* (2013.01); *C08J 2205/044* (2013.01); *C08J 2367/02* (2013.01)

(58) Field of Classification Search
CPC ........ C08J 9/0095; C08J 9/0052; C08J 3/201; C08J 9/0023; C08J 9/0066; C08J 9/009; C08J 9/122; C08J 2201/032; C08J 2205/044; C08J 2367/02; C08K 5/098; C08K 3/34; C08K 9/04
See application file for complete search history.

(56) References Cited

U.S. PATENT DOCUMENTS

| | | | |
|---|---|---|---|
| 3,072,584 A | | 1/1963 | Karpovich |
| 3,554,932 A | * | 1/1971 | Overcashier ........... C08J 9/0061 521/76 |
| 6,428,297 B1 | * | 8/2002 | Myer .................... B29C 48/022 425/4 C |
| 2004/0122132 A1 | | 6/2004 | Xu et al. |
| 2008/0070998 A1 | * | 3/2008 | Takada .................... C08L 33/04 521/50.5 |
| 2012/0321873 A1 | | 12/2012 | Costeux et al. |
| 2015/0344672 A1 | | 12/2015 | Mani et al. |

OTHER PUBLICATIONS

International Search Report and Written Opinion dated Jul. 17, 2017, in International Application No. PCT/US2017/023621 (24 pgs.).

* cited by examiner

*Primary Examiner* — Kara B Boyle
(74) *Attorney, Agent, or Firm* — Finnegan, Henderson, Farabow, Garrett & Dunner, LLP

(57) ABSTRACT

This disclosure describes processes for producing polymer foams, and compositions of matter relating to these processes. A process includes the steps of dispersing an organic nucleating agent in a dispersing medium to obtain an additive dispersion, contacting the additive dispersion with a mineral nucleating agent to obtain a hybrid nucleating agent containing the organic nucleating agent localized on at least a portion of a surface of the mineral nucleating agent, and contacting the hybrid nucleating agent with a polymer in the presence of a foaming agent to obtain a polymer foam. A foamed polymer of the present disclosure includes a cellular matrix containing a polymer material, and a mineral matrix of particles containing a hybrid nucleating agent dispersed in the cellular matrix, in which the hybrid nucleating agent contains an organic nucleating agent localized on at least a portion of a surface of an inorganic material.

20 Claims, 8 Drawing Sheets

CONTROLLED POLYMER FOAMING USING A HYBRID NUCLEATING AGENT FORMED FROM A MINERAL AND AN ORGANIC NUCLEATING AGENT

CLAIM FOR PRIORITY

This application is a U.S. national phase entry of International Application No. PCT/US2017/023621, filed Mar. 22, 2017 which claims the benefit of priority from U.S. Provisional Application No. 62/329,574, filed on Apr. 29, 2016, to both of which this application claims the benefit of priority, and the entirety of the subject matter of both of which is incorporated herein by reference.

FIELD OF DISCLOSURE

This application relates to materials technology in general and more specifically to the use of hybrid nucleating agents that allow greater control of foam morphology and cellular structure in foams of polymers and other expandable materials.

BACKGROUND OF THE INVENTION

Lightweight components formed from lightweight polymer materials are used in many applications, such as in food packaging and in the automobile industry. One of the main challenges in the field of lightweight materials involves the need to reduce weight while at the same time retaining or increasing the mechanical strength relative to the heavier components being replaced. Another consideration involves cost and the ability to economically produce lightweight materials on an industrial scale.

One of the possible approaches for developing lightweight materials involves the use of expandable materials that can be foamed to reduce the weight or density of a resulting foamed component. A polymer foam can be described as a material with a cellular structure created by the formation of gas bubbles within a polymer. Plastics foaming is a polymer processing technology that involves the use of blowing agents, and sometimes additives such as nucleating agents, to generate cellular structures in a polymer matrix. Polymer foams may offer certain advantages over their solid analogues, including lower foam density, higher thermal insulation, enhanced sound deadening, and tunable mechanical properties.

The properties of polymer foams depend not only on the intrinsic properties of the polymer material and additives contained in the polymer matrix, but also on the foam morphology including the cell density, cell size and size distribution. There are two general approaches for increasing the mechanical strength of foams while maintaining low weight. The first general approach is to use fillers and other materials to reinforce the polymer matrix, and the second general approach is to control foam morphology in order to decrease the cell size without decreasing the foam density. In closed-cell polymer foams especially, the size and distribution of the foam cells can profoundly affect the resulting physical properties. Plastic foams having high cell densities, small cell sizes and narrow cell-size distributions offer notable advantages in various applications for lightweight materials. For example, foams with cell sizes smaller than a critical defect size of the polymer may limit fracture and may reduce the weight without sacrificing the mechanical properties. Therefore, developing straight-forward strategies to control the size and distribution of cells within a polymer foam would be desirable.

The morphology of a polymer foam is governed by the cell nucleation, the cell growth, and the cell coarsening stages of the foaming process. The choice of the base polymers and blowing agents, as well as the methodologies employed to control cell nucleation, ultimately influences the final foam morphology and applications of the resulting foam material. Foamed plastics can be classified in terms of foam flexibility (flexible, semi-flexible and rigid), foam density (low density and high density), foam structure (open cell or closed cell) as well as cell density and pore size (fine celled, microcellular or nanocellular)—all of which are ultimately controlled by the foaming process.

There are three general approaches for producing plastic foams-mechanical, chemical and physical foaming. Mechanical foaming involves mechanically inserting gases into a polymeric melt, suspension or solution, followed by hardening to form a polymer matrix containing entrapped gas bubbles in a cellular structure. Chemical foaming involves the decomposition of a chemical blowing agent contained in a liquid polymeric matrix to produce gas bubbles that form a cellular structure upon cooling and solidification of the polymer matrix. Physical foaming involves dissolution of a gas in a liquid polymer matrix, followed by cell nucleation and growth, to form a cellular structure upon cooling and solidification of the polymer matrix.

Cell nucleation refers to a process leading to the formation of a bubble in an expandable material such as a liquid polymer or polymer composite matrix. Classical nucleation theory classifies cell nucleation into two types-homogeneous nucleation and heterogeneous nucleation. Classical homogeneous nucleation is believed to involve the nucleation of bubbles in a uniform polymer matrix-gas solution in the absence of pre-existing gas cavities or microvoids. In classical homogeneous nucleation, a bubble having a radius of greater than the critical radius ($R_{cr}$) is expected to grow spontaneously, whereas a bubble having a radius smaller than $R_{cr}$ is expected to collapse.

Classical heterogeneous nucleation is believed to involve the formation of a bubble on a heterogeneous nucleating site (e.g., a cavity or microvoid contained on a nucleating agent or impurity) due to, for example, supersaturation of a dissolved gas in a liquid polymer composite matrix. Under one theory of nucleation, it is believed that there exists a finite free energy barrier to allows expansion of pre-existing gas cavities, which is finally overcome as the degree of supersaturation of the dissolved gas increases during a continuous pressure drop. In general, bubble formation is an energetically unfavorable process with an activation energy that is inversely proportional to the cell nucleation rate.

The use of heterogeneous nucleating agents is believed to reduce the activation energy associated with bubble formation by increasing the interfacial order of the gas bubble, which in turn reduces the energetic barrier to nucleation by providing a favorable surface (e.g., cavity or microvoid) for nucleation. Heterogeneous nucleating agents may contain a surface that encourages a dissolved gas to gather (i.e., wet) the surface—thereby promoting supersaturation and bubble nucleation leading to enhanced bubble formation. Furthermore, ideal heterogeneous nucleating agents should possess a high surface area in order to maximize the density of nucleation sites, thus promoting higher cell densities in the resulting polymer foam.

Although the use of heterogeneous nucleating agents to impart greater control over the cellular and mechanical properties of expandable materials has increased the utility and access to newer lightweight materials, the various nucleating agents and processes already employed in the production of polymer foams have not provided a high degree of control over foam morphology and are often economically unfeasible when applied to a commercial or industrial setting. Given that the extension of foamed materials into new applications and markets hinges on the ability to precisely, predictability and economically control cellular morphology, a need exists to discover nucleating agents capable fulfilling these requirements.

SUMMARY OF THE INVENTION

The present inventors have recognized that a need exists to find alternative methods and materials allowing greater control over the morphology and resulting properties of foamed materials. Ideal methods and materials would allow the characteristics of foamed materials, such as the cellular size and density of closed-cell foams, to be controlled and enhanced relative to convention methods and materials in a cost-effective manner.

The following disclosure describes the preparation and use of hybrid nucleating agents that are effective in controlling and enhancing the morphology and resulting properties of foamed materials. Embodiments of the present disclosure, described herein such that one of ordinary skill in this art can make and use them, include the following:

(1) Some embodiments relate to a process for producing a polymer foam involving the steps of: dispersing an organic nucleating agent in a dispersing medium to obtain an additive dispersion; contacting the additive dispersion with a mineral nucleating agent to obtain a hybrid nucleating agent comprising the organic nucleating agent localized on at least a portion of a surface of the mineral nucleating agent; and contacting the hybrid nucleating agent with a polymer in the presence of a foaming agent to obtain a polymer foam;

(2) Some embodiments relate to a process of producing a polymer foam by foaming a polymer in the presence of a hybrid nucleating agent, wherein the hybrid nucleating agent comprises an inorganic material and an organic nucleating agent coating at least a portion of the inorganic material;

(3) Some embodiments relate to a method for amplifying cell density of a foamed product by foaming an expandable material in the presence of a hybrid nucleating agent to obtain a foamed product having an amplified cell density, wherein the hybrid nucleating agent comprises an organic nucleating agent localized on at least a portion of a surface of a mineral nucleating agent, and a ratio of the amplified cell density to a cell density of a cellular product obtained by foaming the expandable material in the presence of the mineral nucleating agent is at least about 5:1;

(4) Some embodiments relate to a hybrid nucleating agent, comprising a mineral nucleating agent, and an organic nucleating agent coated on at least a portion of a surface of the mineral nucleating agent, wherein the hybrid nucleating agent is formed by dispersing the organic nucleating agent in a dispersing medium to obtain an additive dispersion, and contacting the additive dispersion with the mineral nucleating agent followed by an evaporation process to coat the surface of the mineral nucleating agent with the organic nucleating agent;

(5) Some embodiments relate to a process of producing a polymer foam by introducing an organic nucleating agent and a mineral nucleating agent into a polymer composition to obtain a mixture, and then foaming the mixture with a foaming agent to obtain a polymer foam;

(6) Some embodiments relate to a foamed polymer comprising: (i) a cellular matrix comprising a polymer material; and (ii) a mineral matrix of particles comprising a hybrid nucleating agent dispersed in the cellular matrix, wherein the hybrid nucleating agent comprises an organic nucleating agent localized on at least a portion of a surface of an inorganic material.

(7) Some embodiments relate to a masterbatch, comprising a hybrid nucleating agent and a polymer, wherein the hybrid nucleating agent comprises a mineral material and an organic nucleating agent localized on at least a portion of a surface of the mineral material.

Additional objects, advantages and other features of the present disclosure will be set forth in part in the description that follows and in part will become apparent to those having ordinary skill in the art upon examination of the following or may be learned from the practice of the present disclosure. The present disclosure encompasses other and different embodiments from those specifically described below, and the details herein are capable of modifications in various respects without departing from the present invention. In this regard, the description herein is to be understood as illustrative in nature, and not as restrictive.

BRIEF DESCRIPTION OF THE DRAWINGS

Embodiments of this disclosure are explained in the following description in view of figures that show.

DETAILED DESCRIPTION

Process for Producing a Foamed Material

Figure 1:
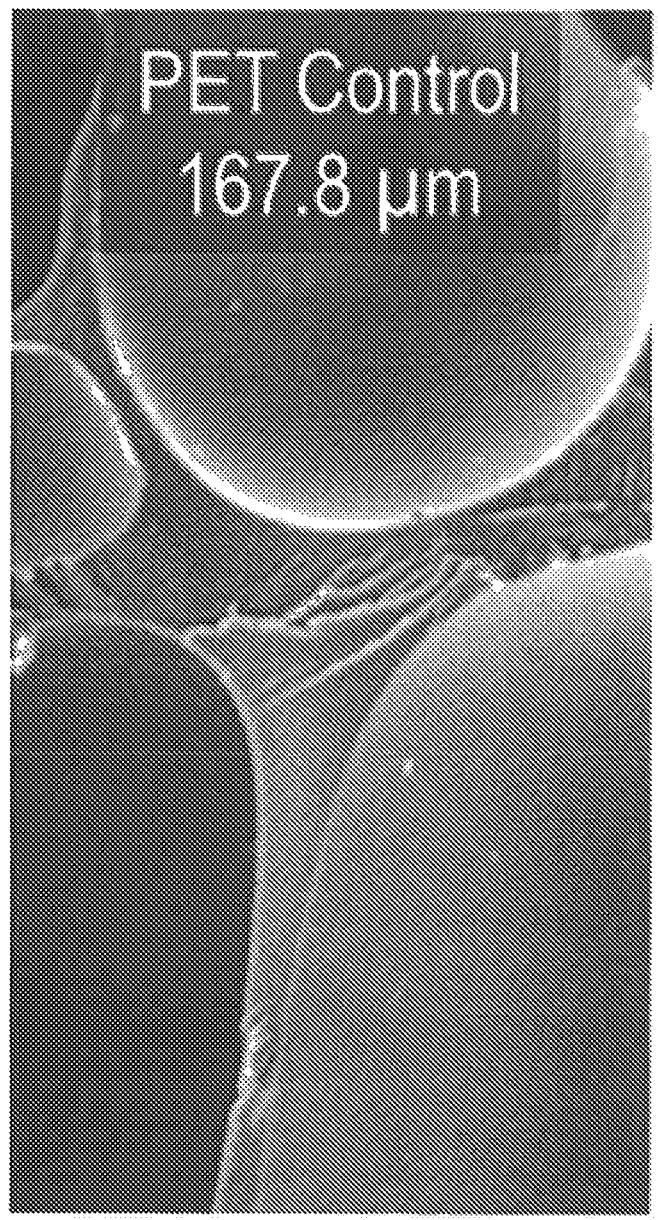
FIG. 1 is a photograph obtained using a scanning electron microscope (SEM) and showing the cross section of a polymer foam formed from polyethylene terephthalate (PET) in the absence of any nucleating agent or other additive.

Embodiments of this disclosure include various processes for producing polymer foams and polymer foam compositions, as well as compositions relating to these processes. Methods for amplifying cell density of a foamed product are also disclosed.

Some embodiments of the present disclosure involve a process for producing a polymer foam by performing at least the following process steps. An organic nucleating agent is dispersed into a dispersing medium to obtain an additive dispersion. The additive dispersion is then contacted with a mineral nucleating agent to obtain a hybrid nucleating agent comprising the organic nucleating agent localized on at least a portion of a surface of the mineral nucleating agent. The hybrid nucleating agent is then contacted with a polymer in the presence of a foaming agent to obtain a polymer foam. Other embodiments relate to a process of producing a polymer foam by foaming a polymer in the presence of a hybrid nucleating agent comprising an organic nucleating agent coating at least a portion of an inorganic material.

Dispersing Medium and Additive Dispersion

In the above process, the "dispersing medium" may be a liquid substance capable of dispersing the organic nucleating agent. In other embodiments the dispersing medium may be a liquid substance capable of dissolving the organic nucleating agent, such that the additive dispersion is an additive solution or an additive mixture in which at least a portion of the organic nucleating agent is dissolved in the dispersing medium. In still other embodiments the dispersing medium may be a gas or a supercritical fluid.

The dispersing medium may contain a single substance or a mixture of substances. For example, the dispersing medium may contain a single solvent or a mixture of solvents. The solvent may be capable of completely or partially dissolving the organic nucleating agent and/or may be capable of completely or partially dispersing the organic nucleating agent. In some embodiments the dispersing medium may contain at least one solvent and at least one dispersing agent capable of promoting or enhancing dispersion of the organic nucleating agent and/or the mineral nucleating agent in the at least one solvent. The dispersing agent may be, for example, a surfactant, a flocculent, a clarifying agent, a detergent, an emulsifier, a wetting agent, a surface modifying agent, just to name a few, as well as other dispersing agents known in the art.

In some embodiments the dispersing medium may be an aqueous dispersing medium. An aqueous dispersing medium may include water, or a mixture of water and at least one organic solvent. The dispersing medium may also contain water, at least one organic solvent and at least one dispersing agent. In some embodiments the dispersing medium is a homogeneous dispersing medium, while in other embodiments the dispersing medium is a heterogeneous dispersing medium.

In some embodiments the dispersing medium may be a multi-phase dispersing medium. For example, the dispersing medium may be a two-phase dispersing medium, such that the organic nucleating agent is attracted to a first phase while the mineral nucleating agent is attracted to a second phase. In some embodiments the hybrid nucleating agent may be obtained from a first phase or a second phase of a two-phase phase dispersing medium, in which the organic nucleating agent is attracted to a first phase and the mineral nucleating agent is attracted to a second phase. In other embodiments the hybrid nucleating agent may be obtained from a third phase of a multi-phase dispersing medium, in which the organic nucleating agent is attracted to a first phase and the mineral nucleating agent is attracted to a second phase.

In some embodiments the dispersing medium is selected based on the solubility and/or dispersion characteristics of the organic nucleating agent, the mineral nucleating agent, or both, in the dispersing medium. For example, the dispersing medium may be selected such that the organic nucleating agent is at least partially soluble in the dispersing medium, while the mineral nucleating agent is at least partially dispersible in the dispersing medium. In other embodiments the dispersing medium is selected such that the organic nucleating agent and the mineral nucleating agent are both at least partially dispersible in the dispersing medium.

In some embodiments the dispersing medium is selected such that the organic nucleating agent is localized as a crystalline organic nucleating agent on a surface of the hybrid nucleating agent. In other embodiments the dispersing medium is selected such that the organic nucleating agent is localized as an amorphous (non-crystalline) organic nucleating agent on a surface of the hybrid nucleating agent. In still other embodiments the dispersing medium is selected such that the organic nucleating agent simultaneously exists in both crystalline form and amorphous form on a surface of the hybrid nucleating agent.

In some embodiments the dispersing medium contains water and at least one organic solvent, such that a ratio of the water to the at least one organic solvent ranges from about 0.1:99.99 to about 99.9:0.1. This ratio may be determined based on the respective volumes of the water and the at least one organic solvent (v/v), or the respective masses of the water and the at least one organic solvent (wt/wt). In other embodiments the ratio of the water to the at least one organic solvent ranges from about 1:99 to about 99:1, or from about 5:95 to about 95:5, or from about 10:90 to about 90:10, or from about 15:95 to about 95:15, or from about 20:80 to about 80:20, or from about 25:75 to about 75:25, or from about 30:70 to about 70:30, or from about 35:65 to about 65:35, or from about 40:60 to about 60:40, or from about 45:55 to about 55:45, or is about 50:50.

In some embodiments the dispersing medium contains a mixture of two organic solvents, such that a ratio of the first organic solvent to the second organic solvent ranges from about 0.1:99.99 to about 99.9:0.1. This ratio may be determined based on the respective volumes of the first organic solvent and the second organic solvent (v/v), or the respective masses of the first organic solvent and the second organic solvent (wt/wt). In other embodiments the ratio of the first organic solvent to the second organic solvent ranges from about 1:99 to about 99:1, or from about 5:95 to about 95:5, or from about 10:90 to about 90:10, or from about 15:95 to about 95:15, or from about 20:80 to about 80:20, or from about 25:75 to about 75:25, or from about 30:70 to about 70:30, or from about 35:65 to about 65:35, or from about 40:60 to about 60:40, or from about 45:55 to about 55:45, or is about 50:50.

In some embodiments the dispersing medium contains water, while in other embodiments the dispersing medium contains at least one organic solvent. In some embodiments the dispersing medium comprises at least one solvent selected from the group consisting of water, an ether-containing solvent, an alcohol-containing solvent, an amine-containing solvent, an acid-containing solvent, an ester-containing solvent, a ketone-containing solvent, an aromatic hydrocarbon-containing solvent, an aliphatic hydrocarbon-containing solvent, a polar protic solvent, a polar aprotic solvent, and mixtures thereof. Solvents of the dispersing medium also be compounds of mixed character, such as aliphatic-aromatic compounds, alcohol-ester compounds, alcohol-ether compounds, to name a few. Solvents of the dispersing medium may also be halogenated compounds such as halogenated aromatic compounds and halogenated aliphatic compounds.

In some embodiments the dispersing medium comprises at least one solvent selected from the group consisting of acetone, acetonitrile, anisole, benzene, benzonitrile, benzyl alcohol, 1,3-butanediol, 2-butanone, tert-butanol, 1-butanol, 2-butanol, 2-(2-butoxyethoxy)ethyl acetate, 2-butoxyethyl acetate, butyl acetate, tert-butyl aceto acetate, tert-butyl methyl ether, carbon disulfide, carbon tetrachloride, chlorobenzene, 1-chlorobutane, chloroform, cyclohexane, cyclopentane, cyclopentyl methyl ether, decane, dibutyl ether, 1,2-dichlorobenzene, 1,2-dichloroethane, dichloromethane, diethyl ether, diethylene glycol butyl ether, diethylene glycol diethyl ether, diethylene glycol dimethyl ether, diethylene glycol monoethyl ether, diethylene glycol monoethyl ether acetate, diisopropyl ether, N,N-diisopropylethylamine, 1,2-dimethoxyethane, dimethyl carbonate, dimethyl sulfoxide, N,N-dimethylacetamide, 1,4-dioxane, 1,3-dioxolane, dodecane, ethanol, 2-ethoxyethanol, ethyl 3-ethoxypropionate, ethyl acetate, ethylbenzene, ethylene carbonate, ethylene glycol, ethylene glycol butyl ether, ethylene glycol diethyl ether, 2-ethylhexyl acetate, formamide, glycerol, heptane, 2-heptanone, hexadecane, hexane, hexanol, isopentyl acetate, isopropyl acetate, isopropyl alcohol, methanol, 2-methoxyethanol, 2-methoxyethyl acetate, 1-methoxy-2-propanol, methyl acetate, methyl formate, 2-methylbutane, isoamyl alcohol, methylcyclohexane, 5-methyl-2-hexanone, 4-methyl-2-pentanone, isobutyl alcohol, 1-methyl-2-pyrrolidinone, 2-methyltetrahydrofuran, nitrobenzene, nitromethane, nonane, octane, 1-octanol, pentane, 1-pentanol, 2-pentanone, 3-pentanone, petroleum ether, piperidine, 1-propanol, 2-propanol, 2-propoxyethanol, propyl acetate, propylene carbonate, pyridine, 1,1,2,2-tetrachloroethane, tetrachloroethylene, tetrahydrofuran, toluene, 1,2,4-trichlorobenzene, 2,2,4-trimethylpentane, water, m-xylene, o-xylene, p-xylene, and mixtures thereof.

In some embodiments the dispersing medium comprises at least one solvent selected from the group consisting of water, acetone, acetonitrile, chloroform, dichloromethane, dimethylformamide, dimethylsulfoxide, ethanol, ethyl acetate, methanol, isopropanol, tetrahydrofuran, and mixtures thereof.

A molarity concentration of the organic nucleating agent in the additive dispersion may range from about 0.01M to about 10M. In other embodiments the concentration of the organic nucleating agent in the additive dispersion in molarity may range from about 0.05M to about 5.0M, or from about 0.1M to about 3.0M, or from about 0.5M to about 2.0M, or from about 1M to about 2M. A mass ratio of the organic nucleating agent in the additive dispersion may range from about 0.1% by mass to about 95% by mass, relative to a total mass of the dispersing medium. In other embodiments the mass ratio of the organic nucleating agent in the additive dispersion may range from about 1% by mass to about 75% by mass, or from about 2% by mass to about 50% by mass, or from about 2% by mass to about 50% by mass, or from about 5% by mass to about 30% by mass, or from about 7.5% by mass to about 20% by mass, or from about 8% by mass to about 15% by mass, relative to a total mass of the dispersing medium.

In some embodiments the dispersing medium is a gas or a supercritical fluid. In some non-limiting examples, the contacting of the organic nucleating agent with the mineral nucleating agent occurs by chemical vapor deposition (CVD) method such that the organic nucleating agent is initially vaporized or sublimed to form a gas or in the presence of an additional gas. The term "supercritical fluid" describes a substance existing at a temperature and pressure about a critical point of the substance wherein distinct liquid and gas phases do not exist. In some non-limiting examples, the contacting of the organic nucleating agent with the mineral nucleating agent occurs by dispersing or dissolving the organic nucleating agent in a supercritical fluid, such as supercritical carbon dioxide or water, to form a supercritical additive mixture that is contacted with the mineral nucleating agent. The supercritical additive mixture may be a supercritical additive dispersion or a supercritical additive solution.

Contacting the Organic Nucleating Agent with the Mineral Nucleation Agent

As explained above, in some embodiments the additive dispersion is contacted with the mineral nucleating agent to obtain the hybrid nucleating agent comprising the organic nucleating agent localized on at least a portion of a surface of the mineral nucleating agent. The contacting step may involve a process in which the additive dispersion is applied to the surface of the mineral nucleating agent to obtain a coated mineral nucleating agent, which is then further processed to obtain the hybrid nucleating agent. In other embodiments the contacting step may involve a process in which the mineral nucleating agent is suspended or dispersed within the additive dispersion, or blended with the additive dispersion, to obtain a hybrid mixture, which is then further processed to obtain the hybrid nucleating agent. In still other embodiments the contacting step may involve a dry mixing process in which the organic nucleating agent and the mineral nucleating agent are blended in the absence of a dispersing or solubilizing medium to obtain a mixture, which is then further processed to obtain the hybrid nucleating agent.

Figure 6A:
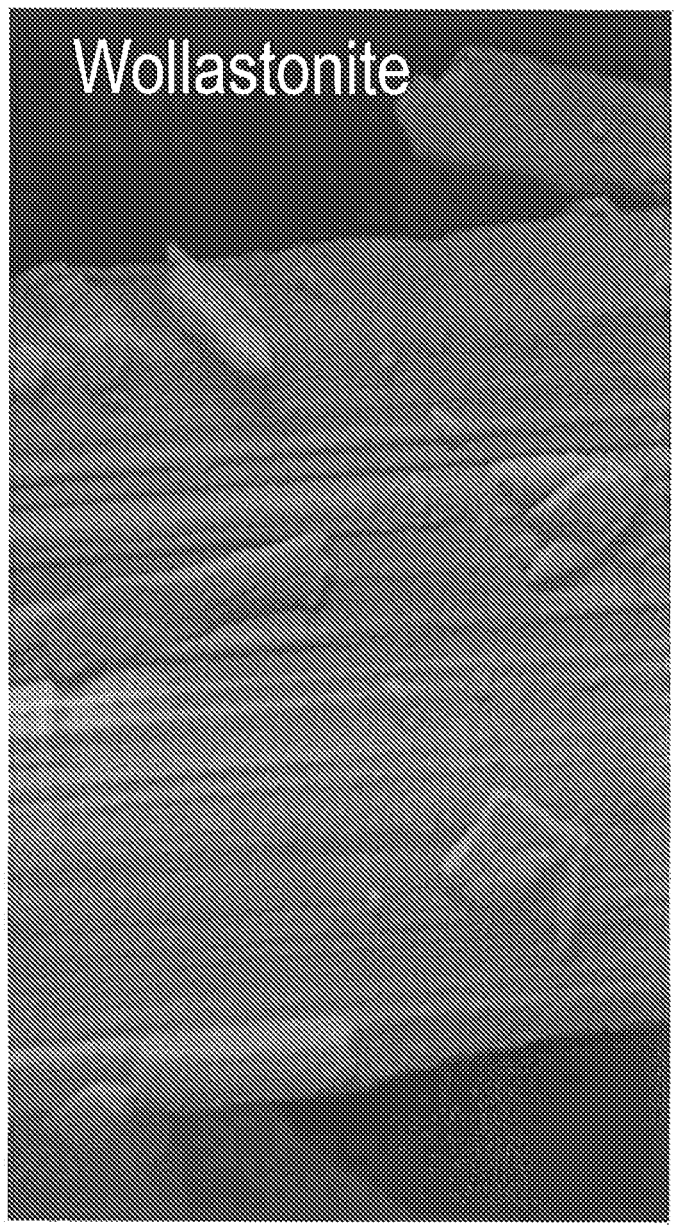
FIG. 6a is a SEM photograph showing the surface of Wollastonite without an organic nucleating agent localized on its surface.
Figure 6B:
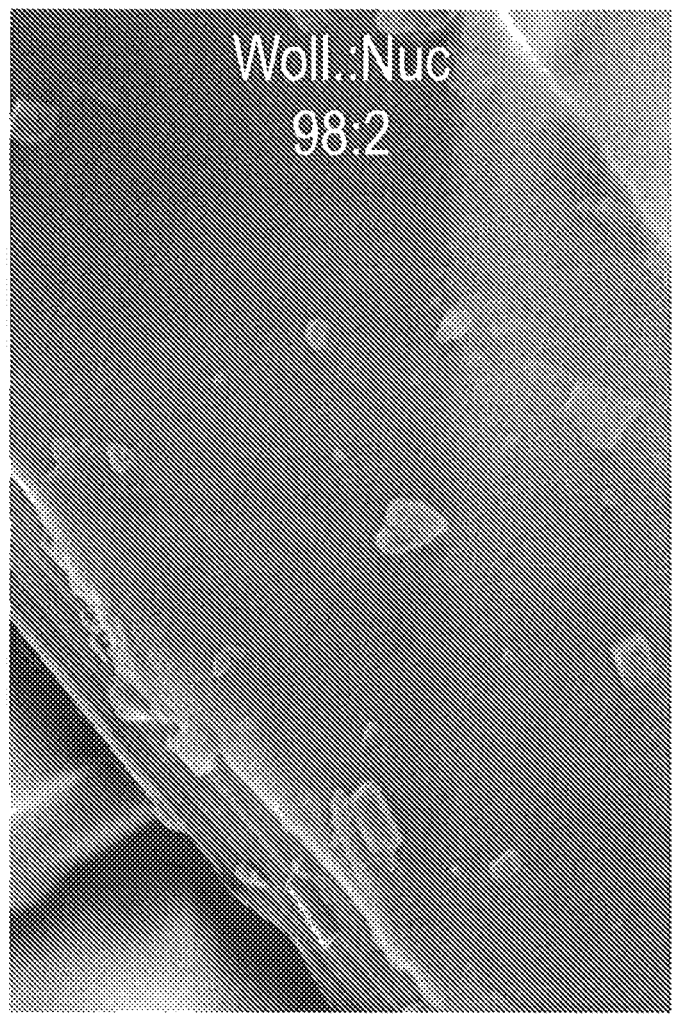
FIG. 6b is a SEM photograph showing the surface of a hybrid nucleating agent formed of sodium benzoate and Wollastonite in a mass ratio of 98:2.
Figure 6C:
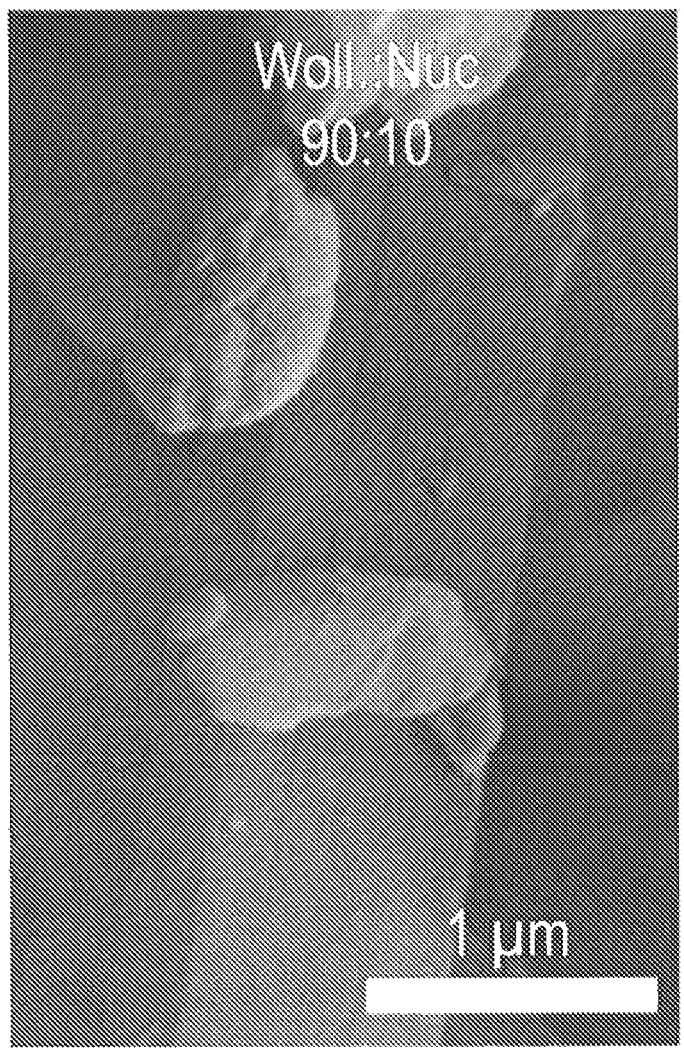
FIG. 6c is a SEM photograph showing the surface of a hybrid nucleating agent formed of sodium benzoate and Wollastonite in a mass ratio of 90:10.

FIGS. 6b and 6c illustrate non-limiting examples of hybrid nucleating agents comprising an organic nucleating agent localized on at least a portion of a surface of a mineral nucleating agent. FIG. 6a is a SEM image of wollastonite showing, among other surface characteristics, distinctive lines running along the longitudinal axis of the mineral structure. FIG. 6b is a SEM image of the Hybrid Nucleating Agent A (used in Inventive Example 3) having a mass ratio of the sodium benzoate to the calcium silicate of 2:98. FIG. 6c is a SEM image of the Hybrid Nucleating Agent B (used in Inventive Example 4) having a mass ratio of the sodium benzoate to the calcium silicate of 10:90. As shown in FIGS. 6b and 6c, the lines running along the longitudinal axis of the wollastonite structure are greatly diminished in the Hybrid Nucleating Agents A and B. FIGS. 6b and 6c illustrate embodiments in which the organic nucleating agent is localized in the form of a coating on the surface of the mineral nucleating agent.

Further processing of a coated mineral nucleating agent, or of a hybrid mixture, as mentioned above, may include removal of the dispersing medium through an evaporative process, followed by drying of the hybrid nucleating agent. In other embodiments a coated mineral nucleating agent, for example, may be further processed by drying without the removal of the dispersing medium through an evaporative process. In other embodiments, a coating mineral nucleating agent or a hybrid mixture may be further processed by removal of the dispersing medium without a separate drying step. The dispersing medium may be removed using an evaporative process, or may be removed using other processes known in the art such as a solid-phase or liquid-phase extraction.

Evaporative processes as mentioned above may involve the use of reduced pressure with or without heating of the coated mineral nucleating agent or hybrid mixture. Removal of the dispersing medium (gas or supercritical fluid) may occur until the hybrid nucleating agent is dried to contain less than about 5 wt. % of the dispersing medium, relative to a total weight of the hybrid nucleating agent. In other embodiments the removal of the dispersing medium (gas or supercritical fluid) may occur until the hybrid nucleating agent is dried to contain less than about 1 wt. % of the dispersing medium, or less than about 0.5 wt. % of the dispersing medium, or less than about 0.1 wt. % of the dispersing medium, or less than about 0.01 wt. % of the dispersing medium, relative to a total weight of the hybrid nucleating agent.

In some embodiments the organic nucleating agent is contacted with the mineral nucleating agent to obtain the hybrid nucleating agent, such that a ratio of a mass of the organic nucleating agent relative to a mass of the mineral nucleating agent during the contacting step ranges from about 0.001:99.999 to about 75:25. In other embodiments the mass ratio of the organic nucleating agent to the mineral nucleating agent during the contact step ranges from about 0.01:99.99 to about 70:30, or from about 0.05:99.95 to about 60:40, or from about 0.1:99.9 to about 50:50, or from about 0.2:99.9 to about 40:60, or from about 0.3:99.7 to about 35:60, or from about 0.5:99.5 to about 30:70, or from about 0.7:99.3 to about 25:75, or from about 0.8:99.2 to about 20:80, or from about 1:99 to about 15:85, or from about 0.1:99.99 to about 15:85, or from about 0.1:99.99 to about 12:88, or from about 0.2:99.98 to about 10:90, or from about 0.5:99.95 to about 10:90, or from about 0.1:99.9 to about 5:95, or from about 0.5:99.5 to about 4:96, or from about 1:99 to about 5:95, or from about 0.5:99.5 to about 4:96, or from about 0.7:99.3 to about 2:98.

In embodiments involving a process in which the additive dispersion is applied to the surface of the mineral nucleating agent to obtain an at least partially coated mineral nucleating agent, which is then further processed to obtain the hybrid nucleating agent, the mass ratio of the organic nucleating agent to the mineral nucleating agent during the application step to form the coated mineral nucleating agent ranges from about 0.001:99.999 to about 75:25. In other embodiments the mass ratio of the organic nucleating agent to the mineral nucleating agent during the application step to form the coated mineral nucleating agent ranges from about 0.01:99.99 to about 70:30, or from about 0.05:99.95 to about 60:40, or from about 0.1:99.9 to about 50:50, or from about 0.2:99.9 to about 40:60, or from about 0.3:99.7 to about 35:60, or from about 0.5:99.5 to about 30:70, or from about 0.7:99.3 to about 25:75, or from about 0.8:99.2 to about 20:80, or from about 1:99 to about 15:85, or from about 0.1:99.99 to about 15:85, or from about 0.1:99.99 to about 12:88, or from about 0.2:99.98 to about 10:90, or from about 0.5:99.95 to about 10:90, or from about 0.1:99.9 to about 5:95, or from about 0.5:99.5 to about 4:96, or from about 1:99 to about 5:95, or from about 0.5:99.5 to about 4:96, or from about 0.7:99.3 to about 2:98.

In embodiments involving a process in which the mineral nucleating agent is suspended or dispersed within the additive dispersion, or is blended with the additive dispersion, to obtain a hybrid mixture which is then further processed to obtain the hybrid nucleating agent, the mass ratio of the organic nucleating agent to the mineral nucleating agent during the suspension, dispersion or blending step ranges from about 0.001:99.999 to about 75:25. In other embodiments the mass ratio of the organic nucleating agent to the mineral nucleating agent during the suspension, dispersion or blending step ranges from about 0.01:99.99 to about 70:30, or from about 0.05:99.95 to about 60:40, or from about 0.1:99.9 to about 50:50, or from about 0.2:99.9 to about 40:60, or from about 0.3:99.7 to about 35:60, or from about 0.5:99.5 to about 30:70, or from about 0.7:99.3 to about 25:75, or from about 0.8:99.2 to about 20:80, or from about 1:99 to about 15:85, or from about 0.1:99.99 to about 15:85, or from about 0.1:99.99 to about 12:88, or from about 0.2:99.98 to about 10:90, or from about 0.5:99.95 to about 10:90, or from about 0.1:99.9 to about 5:95, or from about 0.5:99.5 to about 4:96, or from about 1:99 to about 5:95, or from about 0.5:99.5 to about 4:96, or from about 0.7:99.3 to about 2:98.

In some embodiments in which the organic nucleating agent and the mineral nucleating agent are contacted to obtain the hybrid nucleating agent, the contacting does not occur in the presence of a filler material. In other embodiment in which the organic nucleating agent and the mineral nucleating agent are contacted to obtain the hybrid nucleating agent, the contacting occurs in the presence of a filler material which is different from the mineral nucleating agent.

In some embodiments the contacting of the mineral nucleating agent with the additive dispersion to obtain the hybrid nucleating agent does not occur in the presence of a filler material. In other embodiments the contacting of the mineral nucleating agent with the additive dispersion to obtain the hybrid nucleating agent occurs in the presence of a filler material which is different from the mineral nucleating agent.

In some embodiments in which an organic nucleating agent is contacted with an inorganic material to obtain a hybrid nucleating agent, the contacting of the organic nucleating agent with the inorganic material does not occur in the presence of a filler material. In other embodiments in which an organic nucleating agent is contacted with an inorganic material to obtain a hybrid nucleating agent, the contacting occurs in the presence of a filler material which is different from the inorganic material.

"Filler materials" of the present disclosure may include organic and inorganic particulates and fibers. Examples of filler materials include silica, alumina, wood flour, gypsum, talc, mica, carbon black, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite, (a crystalline calcium silicate gel), perlite, vermiculite, hydrated or unhydrated hydraulic cement particles, pumice, perlite, zeolites, kaolin, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers, such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, and recycled paper fibers, for example, from repulping operations, just to name a few.

Organic Nucleating Agent

"Organic nucleating agents" of the present disclosure include organic compounds and organic materials capable of inducing cell nucleating in at least one expandable material in the presence of a gas. In some embodiments the organic nucleating agent may be in the form of neutral or charged organic particles including nanoparticles, while in other embodiments the organic nucleating agent may be in the form of neutral or charged organic compounds. In some embodiments the organic nucleating agent may be in the form of a solid (amorphous or crystalline), liquid-crystalline, or a liquid. Organic nucleating agents may be used individually or may be used as mixtures of different organic nucleating agents.

In some embodiments the organic nucleating agent is at least one selected from the group consisting of a carboxylic acid, a salt of a carboxylic acid, an organic sulfonate salt, a carboxylic acid amide, an organic phosphoric compound, a salt of an organic phosphoric compound, an acetal-containing compound, or mixtures thereof. Examples of carboxylic acids include dicarboxylic acids such as oxalic acid, 1,2-cyclohexanedicarboxylic acid, phathalic acid, malonic acid and suberic acid. Examples of metal carboxylates include sodium benzoate, sodium naphthenoate, aluminium p-tert-butyl benzoate, aluminum benzoate; sodium adipate, sodium-bicyclo[2.2.1]heptane-2,3-dicarboxylate, as well as norbornene carboxylic acid salts, metal salts of suberic acid, and metal salts of hexahydrophthalic acid. Examples of metal organophosphates include sodium bis(4-tert-butylphenyl) phosphate, sodium-2,2'-methylene-bis(4,6-di-tert-butylphenyl) phosphate, lithium 2,2'-methylene-bis(4,6-di-tert-butylphenyl)phosphate, and aluminum 2,2'-methylenebis(4,6-di-tert-butylphenyl) phosphate. Examples of acetal-containing compounds include benzylidine sorbitol compounds such as bis(methylbenzylidene)sorbitol, bis(dimethylbenzylidene) sorbitol, di(p-tolylidene) sorbitol, dibenzylidene sorbitol, di(p-methylbenzylidene) sorbitol, di(p-ethyl benzylidene) sorbitol and bis(3,4-dimethylbenzylidene) sorbitol. Examples of phosphorous-containing compounds include metal phosphates such as sodium phosphate, phosphate esters and phosphate ester salts. Examples of organic nucleating agents also include nucleating agents already known in the relevant art to enhance bubble formation and crystallization. In some embodiments the organic nucleating agent is a nanoparticle, such as a charged or uncharged nanotube.

In some embodiments the organic nucleating agent is at least one selected from the group consisting of aluminum dibenzoate, barium benzoate, barium stearate, benzylidene sorbitol, a derivative of benzylidene sorbitol, calcium benzoate, calcium montanate, calcium myristate, calcium octacosanoate, calcium oxalate, calcium stearate, erucic acid amide, ethylene bis-lauric acid amide, hydroxystearic acid amide, lithium benzoate, lithium dibenzoate, lithium stearate, lithium terephthalate, magnesium benzoate, magnesium stearate, 2,2-methylbis(4,6-di-t-butylphenyl)sodium, palmitic acid amide, potassium benzoate, potassium dibenzoate, potassium laurate, potassium myristate, potassium salicylate, potassium stearate, potassium terephthalate, sodium benzoate, sodium cyclohexane carboxylate, sodium laurate, sodium-2,2'-methylenebis(4,6-di-t-butylphenyl) phosphate, sodium montanate, sodium myristate, sodium β-naphthalate, sodium octacosanoate, sodium salicylate, sodium sulfoisophthalate, sodium stearate, sodium terephthalate, sodium p-toluene sulfonate, sodium toluoylate, stearic acid amide, tris(t-butylamide) trimesate, zinc salicylate, and mixtures thereof.

In some embodiments the organic nucleating agent is an amorphous organic nucleating agent, while in other embodiments the organic nucleating agent is a crystalline organic nucleating agent. Without being bound to any particular theory, it is believed that the physical structure and characteristics of the organic nucleating agent, at least in part, enable the hybrid nucleating agent to control and enhance the morphology and cellular characteristics of foamed materials of the present disclosure. In some embodiments it is believed that a crystalline organic nucleating agent localized on a surface of the hybrid nucleating agent may induce heterogeneous nucleation by forming microcrystals (i.e., crystallites) of the polymer or expandable material which reduces the energetic barrier to bubble formation. In other embodiments it is believed that an organic nucleating agent localized on a surface of the hybrid nucleating agent may induce heterogeneous nucleation by serving as a wetting agent that encourages a dissolved gas to gather (i.e., wet) the surface of the hybrid nucleating agent-thereby promoting supersaturation and bubble nucleation leading to enhanced bubble formation. In other embodiments it is believed that a charged (ionic) organic nucleating agent, or otherwise reactive organic nucleating agent, localized on a surface of the hybrid nucleating agent may induce heterogeneous nucleation by reacting with a reactive polymer (such as a polyester) leading to activated sites in the reactive polymer which act as nucleation sites for bubble formation.

In some embodiments a crystalline organic nucleating agent is contacted with the mineral nucleating agent to obtain a hybrid nucleating agent comprising the organic nucleating agent localized as a crystallite on at least a portion of a surface of the mineral nucleating agent. In other embodiments an amorphous organic nucleating agent is contacted with the mineral nucleating agent to obtain a hybrid nucleating agent comprising the organic nucleating agent localized as a crystallite on at least a portion of a surface of the mineral nucleating agent. In other embodiments an amorphous organic nucleating agent is contacted with the mineral nucleating agent to obtain a hybrid nucleating agent comprising the organic nucleating agent localized in an amorphous (non-crystalline) form on at least a portion of a surface of the mineral nucleating agent. In still other embodiments an amorphous and/or crystalline organic nucleating agent is contacted with the mineral nucleating agent to obtain a hybrid nucleating agent comprising the organic nucleating agent localized as a mixture of crystallite and amorphous forms on at least portion of a surface of the mineral nucleating agent.

In some embodiments the organic nucleating agent crystallizes to form features that are about 250 nm to about 1 micron in size on a surface of the mineral nucleating agent. Without be bound by any theory, such crystallites may act as physical defects on the surface of the mineral nucleating agent-thereby enhancing surface roughness of the hybrid nucleating agent and promoting nucleation.

Mineral Nucleating Agent

"Mineral nucleating agents" of the present disclosure include inorganic materials capable of interacting with an organic nucleating agent to obtain a hybrid material having the organic nucleating agent localized on a surface of the inorganic material. In some embodiments the mineral nucleating agent may be an inorganic material that independently acts as a heterogeneous nucleating agent for inducing bubble formation in expandable materials, while in other embodiments the mineral nucleating agent may be an inorganic material that does not independently act as a heterogeneous nucleating agent for inducing bubble formation in expandable materials. Mineral nucleating agents may be used individually or may be used as mixtures of different mineral nucleating agents.

In some embodiments the mineral nucleating agent is a mineral material that is capable of being wetted by a gas serving as the foaming agent—whereas a filler material is a mineral material that is not capable of being wetted by the gas serving as the foaming agent. In some embodiments a filler material is a mineral material added to a pre-foaming mixture in a proportion of greater than 10 wt. % relative to a total weight of the pre-foaming mixture-whereas a proportion of the mineral nucleating agent is less than or equal to 10 wt. % relative to the total weight of the pre-foaming mixture.

In some embodiments the mineral nucleating agent may be in the form of an inorganic particulate material, or may be in the form of an inorganic fibrous material. In some embodiments the mineral nucleating agent may be in the form of a porous inorganic mineral, such as a zeolite.

In some embodiments the mineral nucleating agent is at least one selected from the group consisting of a mineral aggregate, a mineral fiber, a natural clay, a synthetic clay, a glass bead, a talc, a mica, and mixtures thereof. In some embodiments the mineral nucleating agent is at least one selected from the group consisting of a kaolin, a bentonite, a chloritic talc, a milled expanded perlite, a diatomite, a talc, a mica, a wollastonite, a titania, a silica, and mixtures thereof.

In some embodiments the mineral nucleating agent is at least one selected from the group consisting of a metal oxide, a metal silicate, a metal sulfate, a metal carbonate, an metal oxosulfate, a metal phosphate, a metal phosphonate, and mixtures thereof. In some embodiments the mineral nucleating agent is at least one selected from the group consisting of a titanium dioxide, a silicon dioxide, a calcium silicate, a calcium sulfate, and mixtures thereof.

In some embodiments the mineral nucleating agent is a silicate or an alumino-silicate of an alkali or alkaline earth metal. In some embodiments the mineral nucleating agent comprises at least one selected from the group consisting of calcium silicate, magnesium silicate, beryllium silicate, strontium silicate, barium silicate, and mixtures thereof. For example, the mineral nucleating agent may be a synthetic calcium silicate or a natural calcium silicate such as a wollastonite.

In some embodiments the mineral nucleating agent is contacted with an organic nucleating agent to obtain a hybrid nucleating agent, such that the contacting does not occur in the presence of a filler material. In other embodiments the mineral nucleating agent is contacted with an organic nucleating agent to obtain a hybrid nucleating agent, such that the contacting occurs in the presence of a filler material that is different from the mineral nucleating agent.

In some embodiments the mineral nucleating agent has a median particle size ($d_{50}$) of greater than or equal to about 1 µm, such as, for example, greater than or equal to about 3 µm, greater than or equal to about 5 µm, greater than or equal to about 7 µm, greater than or equal to about 9 µm, greater than or equal to about 10 µm, greater than or equal to about 11 µm, greater than or equal to about 12 µm, greater than or equal to about 13 µm, greater than or equal to about 14 µm, or greater than or equal to about 15 µm. In other embodiments, the mineral nucleating agent has a median particle size ($d_{50}$) ranging from about 1 µm to about 15 µm, such as, for example, from about 1 µm to about 5 µm, from about 5 µm to about 10 µm, from about 10 µm to about 15 µm, from about 1 µm to about 3 µm, from about 3 µm to about 6 µm, from about 6 µm to about 9 µm, from about 9 µm to about 12 µm, or from about 12 µm to about 15 µm.

In some embodiments the mineral nucleating agent has a BET surface area of greater than or equal to about 3.0 $m^2/g$. For example, the mineral nucleating agent may have a BET surface area greater than or equal to about 10 $m^2/g$, greater than or equal to about 50 $m^2/g$, greater than or equal to about 75 $m^2/g$, greater than or equal to about 90 $m^2/g$, greater than or equal to about 100 $m^2/g$, greater than or equal to about 150 $m^2/g$, greater than or equal to about 200 $m^2/g$, greater than or equal to about 250 $m^2/g$, or greater than or equal to about 300 $m^2/g$. In other embodiments the mineral nucleating agent may have a BET surface area ranging from about 3.0 $m^2/g$ to about 300 $m^2/g$. For example, the mineral nucleating agent may have a BET surface area in a range from about 10 $m^2/g$ to about 100 $m^2/g$, from about 100 $m^2/g$ to about 300 $m^2/g$, from about 50 $m^2/g$ to about 150 $m^2/g$, from about 10 $m^2/g$ to about 50 $m^2/g$, from about 3 $m^2/g$ to about 25 $m^2/g$, from about 150 $m^2/g$ to about 250 $m^2/g$, from about 200 $m^2/g$ to about 300 $m^2/g$, or from about 100 $m^2/g$ to about 200 $m^2/g$.

"BET surface area," as used herein, refers to the technique for calculating specific surface area of physical absorption molecules according to Brunauer, Emmett, and Teller ("BET") theory. BET surface area can be measured, for example, with an ASAP® 2460 Surface Area and Porosimetry Analyzer using nitrogen as the sorbent gas, available from Micromeritics Instrument Corporation (Norcross, Ga., USA).

In some embodiments the mineral nucleating agent may have an aspect ratio in the range of from about 1 to about 50, such as for example from about 1 to about 25, or from about 1.5 to about 20, or from about 2 to about 10. The aspect ratio may be determined according to Jennings theory. The Jennings theory (or Jennings approximation) of aspect ratio is based on research performed by W. Pabst, E. Gregorova, and C. Berthold, Department of Glass and Ceramics, Institute of Chemical Technology, Prague, and Institut for Geowissenschaften, Universitat Tobingen, Germany, as described, e.g., in Pabst W., Berthold C.: Part. Part. Syst. Charact. 24 (2007), 458.

In some embodiments the mineral nucleating agent is a surface-modified mineral nucleating agent. The surface chemistry of the mineral nucleating agent may affect the interaction between the organic nucleating agent and the mineral nucleating agent. The surface chemistry of the mineral nucleating agent may also affect the dispersibility of the hybrid nucleating agent in the matrix of an expandable material. The surface chemistry of the mineral nucleating agent may also affect the nucleation efficiency of the hybrid nucleating agent during foaming of an expandable material. In some embodiments a surface modification of the mineral nucleating agent can be used to impart greater control over the morphology and resulting properties of foamed materials prepared in the presence of a hybrid nucleating agent formed of the surface modified mineral nucleating agent.

Surface-modifying agents may include, by non-limiting example, silicon-containing compounds such as silicones and silanes that may or may not contain additional functional groups such as alkylene groups, alkoxy groups, amino groups, aryl groups, carbamate groups, epoxy groups, ester groups, ether groups, halide groups, heteroaryl groups, sulfide and/or disulfide groups, hydroxyl groups, isocyanate group, nitrile groups and ionic (charged) groups.

In some embodiments the mineral nucleating agent may have an oil absorption of greater than or equal to about 300 wt %, such as, for example, greater than or equal to about 320 wt %, greater than or equal to about 350 wt %, greater than or equal to about 370 wt %, greater than or equal to about 400 wt %, greater than or equal to about 420 wt %, or greater than or equal to about 450 wt %.

In some embodiments the mineral nucleating agent may have a water absorption of greater than or equal to about 400 wt %, such as, for example, greater than or equal to about 420 wt %, greater than or equal to about 450 wt %, greater than or equal to about 470 wt %, greater than or equal to about 500 wt %, greater than or equal to about 520 wt %, greater than or equal to about 550 wt %, or greater than or equal to about 570 wt %.

Hybrid Nucleating Agent

"Hybrid nucleating agents" of the present disclosure include hybrid materials containing a mineral nucleating agent and an organic nucleating agent localized on at least a portion of a surface of the mineral nucleating agent. Some embodiments relate to a hybrid nucleating agent formed by dispersing the organic nucleating agent in a dispersing medium to obtain an additive dispersion, and then contacting the additive dispersion with a mineral nucleating agent. In some embodiments a resulting mixture is subjected at least to an evaporative process to obtain the hybrid nucleating agent. Other embodiments involve contacting an organic nucleating agent with a mineral nucleating agent in the absence of a dispersing medium to obtain a hybrid nucleating agent containing the organic nucleating agent localized on at least a portion of a surface of the mineral nucleating agent.

In some embodiments the hybrid nucleating agent comprises a coating of the organic nucleating agent on a the surface of the mineral nucleating agent. A thickness of the coating of the organic nucleating agent may range from about 1 nm to about 250 µm. In other embodiments a thickness of the coating of the organic nucleating agent may range from about 100 nm to about 100 µm, or from about 500 nm to about 50 µm, or from about 1 µm to about 10 µm.

Hybrid nucleating agents in some embodiments include a coating of a surface of the mineral nucleating agent, in which the coating comprises the organic nucleating agent and at least one additive. Additives may include surface modifying agents as described above, as well as filler materials as described above. Additives may also include wetting agents that that encourage dissolved gases to gather the surface of the hybrid nucleating agent—thereby promoting supersaturation and bubble nucleation leading to enhanced bubble formation.

In some embodiments the hybrid nucleating agent comprises the organic nucleating agent bonded to the surface of the mineral nucleating agent. For example, the organic nucleating agent may be chemically bonded to the surface of the mineral nucleating agent through a covalent bond. In other embodiments the organic nucleating agent may bonded to the surface of the mineral nucleating agent through an ionic bond or through a Van der Waals interaction with the mineral nucleating agent or with an additive on a surface of the mineral nucleating agent.

Some embodiments include hybrid nucleating agents comprising an organic nucleating agent that is uniformly distributed over the surface of a mineral nucleating agent. In other embodiments the hybrid nucleating agent comprises an organic nucleating agent that is not uniformly distributed over the surface of the mineral nucleating agent. In some embodiments the hybrid nucleating agent comprises an organic nucleating agent that is localized on only certain portions of the surface of the mineral nucleating agent. For example, in some embodiments the organic nucleating agent is localized or bonded to only certain portions of the surface of the mineral nucleating agent, based on a non-uniform surface chemistry of the mineral nucleating agent. In other embodiments a concentration of the organic nucleating agent on the surface of the mineral nucleating agent is not constant, such that the concentration of the organic nucleating agent is different at different locations on the surface of the mineral nucleating agent. Other embodiments include hybrid nucleating agents comprising an organic nucleating agent that is capable of being released from the surface of the mineral nucleating agent. Such release of the organic nucleating agent may occur due to a triggering mechanism based on conditions such as temperature, pH, irradiation, physical contact (agitation), or the use of an external triggering agent, just to name a few triggering mechanisms.

In some embodiments a coverage rate of the organic nucleating agent on the surface of the mineral nucleating agent ranges from about 5% to about 90%, based on the entire surface of the mineral nucleating agent being 100%. In other embodiments a coverage rate of the organic nucleating agent on the surface of the mineral nucleating agent ranges from about 5% to about 50%, based on the entire surface of the mineral nucleating agent being 100%. In still other embodiments a coverage rate of the organic nucleating agent on the surface of the mineral nucleating agent ranges from about 10% to about 20%, based on the entire surface of the mineral nucleating agent being 100%.

The cell diameter and cell density of a foamed material of the present disclosure may be controlled by performing foaming of the material in the presence of a hybrid nucleating agent. Both the chemical nature and the structural characteristics of the organic nucleating agent on the surface of the hybrid nucleating agent may profoundly affect the cellular characteristics of the foamed material in some embodiments. Cellular characteristics such as the cell diameter ($\varphi$) and the cell density ($N_f$) of the foamed material may be affected by factors including the chemical nature, form, concentration and distribution of the organic nucleating agent on the surface of the mineral nucleating agent.

As explained above, without being bound to any particular theory, it is believed that the physical structure and characteristics of the organic nucleating agent, at least in part, enable the hybrid nucleating agent to control and enhance the morphology and cellular characteristics of foamed materials of the present disclosure.

In some embodiments it is believed that a crystalline organic nucleating agent localized on a surface of the hybrid nucleating agent may induce heterogeneous nucleation by forming microcrystals (i.e., crystallites) of the polymer or expandable material which reduces the energetic barrier to bubble formation. Such crystallites may act as physical defects affecting the roughness of the surface of the hybrid nucleating agent—thereby affecting heterogeneous nucleation. In other embodiments it is believed that an organic nucleating agent localized on a surface of the hybrid nucleating agent may induce heterogeneous nucleation by serving as a wetting agent that encourages a dissolved gas to gather (wet) the surface of the hybrid nucleating agent—thereby promoting supersaturation and bubble nucleation leading to enhanced bubble formation. In other embodiments it is believed that a charged (ionic) organic nucleating agent, or otherwise reactive organic nucleating agent, localized on a surface of the hybrid nucleating agent may induce heterogeneous nucleation by reacting with a reactive polymer (such as a polyester) leading to activated sites in the reactive polymer which act as nucleation sites for bubble formation.

In some embodiments the hybrid nucleating agent comprises the organic nucleating agent localized as a crystallite on at least a portion of a surface of the mineral nucleating agent. In other embodiments the hybrid nucleating agent comprises the organic nucleating agent localized in an amorphous (non-crystalline) form on at least a portion of a surface of the mineral nucleating agent. In still other embodiments the hybrid nucleating agent comprises the organic nucleating agent localized as a mixture of crystallite and amorphous forms on at least portion of a surface of the mineral nucleating agent.

The distribution of the organic nucleating agent localized on a surface of the mineral nucleating agent may be varied to control the cellular characteristics of foamed materials. In some embodiments the cell diameter ($\varphi$) and cell density ($N_f$) of foamed materials can be controlled by altering the distribution and form of the organic nucleating agent on the surface of the hybrid nucleating agent. For example, in some embodiments the cell density ($N_f$) of a foamed material can be increased by non-uniformly distributing the organic nucleating agent on the surface of the hybrid nucleating agent. Non-uniformity may be accomplished in some embodiments by controlling the interaction of the organic nucleating agent with the mineral nucleating agent by, for example, altering the surface chemistry of the mineral nucleating agent. In other embodiments the surface chemistry and/or physical characteristics of the mineral nucleating agent may be altered by including at least one additive on the surface of the mineral nucleating agent that causes the contacting of the organic nucleating agent of occur in a non-uniform fashion.

In some embodiments the hybrid nucleating agent comprises a crystalline organic nucleating agent that is non-uniformly localized on a surface of the mineral nucleating agent, such that the hybrid nucleating agent comprises a plurality of grains or microcrystals of the organic nucleating agent distributed on the surface of the mineral nucleating agent. In other embodiments the hybrid nucleating agent may comprise a plurality of different grains or microcrystals of different organic nucleating agents distributed on the surface of the mineral nucleating agent. In still other embodiments the hybrid nucleating agent may comprise a plurality of grains or microcrystals of a first organic nucleating agent that are uniformly or non-uniformly distributed on a surface of a mineral nucleating agent, and a second organic nucleating agent in amorphous form that is localized on a surface of the mineral nucleating agent.

The relative proportions of the organic nucleating agent and the mineral nucleating agent in the hybrid nucleating agent may be altered to affect the morphology and cellular characteristics of foamed materials. In some embodiments a mass ratio of the organic nucleating agent to the mineral nucleating agent ranges from about 0.001:99.999 to about 50:50. In other embodiments the mass ratio of the organic nucleating agent to the mineral nucleating agent ranges from about 0.01:99.99 to about 15:84, or from about 0.1:99.9 to about 10:90, or from about 0.2:99.8 to about 8:92, or from about 0.5:99.5 to about 5:95, or from about 0.5:99.5 to about 2.5:97.5, or from about 0.7:99.3 to about 2:98.

The mineral content of the hybrid nucleating agent may also be altered to affect the morphology and cellular characteristics of foamed materials. In some embodiments a mineral content of the hybrid nucleating agent, relative a mixture of the hybrid nucleating agent with an expandable material, ranges from about 0.001% by mass to about 20% by mass. In other embodiments a mineral content of the hybrid nucleating agent, relative to a mixture of the hybrid nucleating agent with an expandable material, ranges from about 0.01% by mass to about 15% by mass, or from about 0.1% by mass to about 13% by mass, or from about 0.2% by mass to about 12% by mass, or from about 0.3% by mass to about 10% by mass, or from about 0.5% by mass to about 8% by mass, or from about 0.6% by mass to about 6% by mass, or from about 0.7% by mass to about 5% by mass, or from about 0.8% by mass to about 3% by mass, or from about 0.85% by mass to about 2% by mass, or from about 0.9% by mass to about 1.5% by mass.

The particle size of the hybrid nucleating agent may also be altered to affect the morphology and cellular characteristics of foamed materials. In some embodiments a median particle size ($d_{50}$) of the hybrid nucleating agent may be greater than or equal to about 1 µm, such as, for example, greater than or equal to about 3 µm, greater than or equal to about 5 µm, greater than or equal to about 7 µm, greater than or equal to about 9 µm, greater than or equal to about 10 µm, greater than or equal to about 11 µm, greater than or equal to about 12 µm, greater than or equal to about 13 µm, greater than or equal to about 14 µm, or greater than or equal to about 15 µm. In other embodiments a median particle size ($d_{50}$) of the hybrid nucleating agent ranges from about 1 µm to about 15 µm, such as, for example, from about 1 µm to about 5 µm, from about 5 µm to about 10 µm, from about 10 µm to about 15 µm, from about 1 µm to about 3 µm, from about 3 µm to about 6 µm, from about 6 µm to about 9 µm, from about 9 µm to about 12 µm, or from about 12 µm to about 15 µm. In other embodiments the medium particle size ($d_{50}$) of the hybrid nucleating agent is less than or equal to 1 µm, for example, ranging from about 200 nm to about 1000 nm.

The particle sizes of the various particles of the present disclosure were measured according to the methods know to the skilled person in the art using light scattering of the particulate materials in a fully dispersed condition in an aqueous medium using a Microtrac S3500 laser diffraction machine supplied by Microtrac, a member of Nikkiso. The size of the particles is referred to as the "equivalent spherical diameter" (esd). The measured particle size can be provided as a plot of the cumulative percentage by weight of particles having a given size less than the esd values. The median particle size, $d_{50}$, is the value determined to be the esd at which 50% of the particles by weight have an esd less than that of the particular value.

The surface area of the hybrid nucleating agent may also be altered to affect the morphology and cellular characteristics of foamed materials. In some embodiments a BET surface area of the hybrid nucleating agent is greater than or equal to about 3.0 m$^2$/g. For example, the hybrid nucleating agent may have a BET surface area greater than or equal to about 10 m$^2$/g, greater than or equal to about 50 m$^2$/g, greater than or equal to about 75 m$^2$/g, greater than or equal to about 90 m$^2$/g, greater than or equal to about 100 m$^2$/g, greater than or equal to about 150 m$^2$/g, greater than or equal to about 200 m$^2$/g, greater than or equal to about 250 m$^2$/g, or greater than or equal to about 300 m$^2$/g. In other embodiments the hybrid nucleating agent may have a BET surface area ranging from about 3.0 m$^2$/g to about 300 m$^2$/g. For example, the hybrid nucleating agent may have a BET surface area ranging from about 10 m$^2$/g to about 100 m$^2$/g, from about 100 m$^2$/g to about 300 m$^2$/g, from about 50 m$^2$/g to about 150 m$^2$/g, from about 10 m$^2$/g to about 50 m$^2$/g, from about 3 m$^2$/g to about 25 m$^2$/g, from about 150 m$^2$/g to about 250 m$^2$/g, from about 200 m$^2$/g to about 300 m$^2$/g, or from about 100 m$^2$/g to about 200 m$^2$/g.

"BET surface area," as used herein, refers to the technique for calculating specific surface area of physical absorption molecules according to Brunauer, Emmett, and Teller ("BET") theory. BET surface area can be measured with an ASAP® 2460 Surface Area and Porosimetry Analyzer using nitrogen as the sorbent gas, available from Micromeritics Instrument Corporation (Norcross, Ga., USA).

The shape of the hybrid nucleating agent may also be altered to affect the morphology and cellular characteristics of foamed materials. In some embodiments the hybrid nucleating agent may have an aspect ratio ranging of from about 1 to about 50, such as for example from about 1 to about 25, or from about 1.5 to about 20, or from about 2 to about 10.

The "aspect ratio," as used herein, refers to an aspect ratio measured according to the Jennings theory. The Jennings theory (or Jennings approximation) of aspect ratio is based on research performed by W. Pabst, E. Gregorova, and C. Berthold, Department of Glass and Ceramics, Institute of Chemical Technology, Prague, and Institut für Geowissenschaften, Universitat Tübingen, Germany, as described, e.g., in Pabst W., Berthold C.: Part. Part. Syst. Charact. 24 (2007), 458.

Polymers and Expandable Materials

As explained above, some embodiments of the present disclosure involve the production of a foamed material by contacting the hybrid nucleating agent with an expandable material in the presence of a foaming agent to obtain the foamed material.

"Expandable materials" of present disclosure include organic and inorganic materials capable of being expanded in the presence of a gas to obtain a foamed material. In some embodiments the expandable material may include a mixture of expandable organic materials, a mixture of expandable inorganic materials, or mixture of at least one expandable organic material and at least one inorganic expandable material. Expandable organic materials include organic polymeric materials such as thermoplastic polymers and thermoset polymers, as well as natural and synthetic organic resins. In some embodiments expandable materials may include thermoplastic elastomers.

Some embodiments employ expandable organic materials in the form of polymers selected from the group consisting of a polyolefin, a polyamide, a polycarbonate, a polyimide, a polyurethane, a polyethylenemine, a polyoxymethylene, a polyester, a polyacrylate, and copolymers and blends thereof. In other embodiments the expandable organic material is at least one polymeric material selected from the group consisting of a polystyrene, a polyethylene, a polystyrene, a polyamide, a polyurethane, a poly(ethyl vinyl acetate), a polyethylene terephthalate, and copolymers and blends thereof, to name a few. Polymeric expandable organic materials may be thermoplastic polymers, thermoset polymers, or elastomeric polymers.

Polymer Composites

In some embodiments the contacting of the hybrid nucleating agent with an expandable material to obtain a foamed material involves initially combining the hybrid nucleating agent with expandable material to form a polymer composite, and then foaming the polymer composite in the presence of a foaming agent. For example, the preparation of a polymer composite may involve melt-mixing of the hybrid nucleating agent with a polymer or polymeric mixture, and then extruding a resulting mixture to obtain a polymer-nucleating agent composite. In other embodiments a polymer composite may be obtained by mixing the hybrid nucleating agent with a polymer or a polymeric mixture without melting and/or extrusion. Such expandable composite materials may be further processed into pelletized materials capable of being molded into solid foaming precursors having various shapes and sizes.

Embodiments involving the preparation of a polymer composite may employ a single-step injection-molding process or a two-step extrusion-mixing process. In certain embodiments the compositions and methods disclosed herein may provide improved properties, regardless of whether they were produced using a two-step extrusion-mixing and foaming process, a single-step injection-molding foaming process, or another suitable foaming process. In some embodiments when a single-step injection-molding foaming process is used, advantageous physical properties may be obtained in both the flow direction (FD) of the molding and the transversal direction (TD) to the molding direction. In some embodiments the polymer composite may include a multi-layer polymer composite. One non-limiting example is a multi-layer polymer composite containing alternating layers of at least one foamed layer and at least one solid layer—in which the foamed and solid layers may be composed of the same or different polymers. In other embodiments the polymer composite may include a multi-layer polymer composition containing alternating foamed layers—in which the alternative foamed layers may be composted of the same or different polymers.

The mineral content of the hybrid nucleating agent in polymer composites of the present disclosure may be altered to affect the morphology and cellular characteristics of foamed materials. In some embodiments a mineral content of the hybrid nucleating agent, relative a mixture of the hybrid nucleating agent with an expandable material, ranges from about 0.001% by mass to about 20% by mass. In other embodiments a mineral content of the hybrid nucleating agent, relative to a mixture of the hybrid nucleating agent with an expandable material, ranges from about 0.01% by mass to about 15% by mass, or from about 0.1% by mass to about 13% by mass, or from about 0.2% by mass to about 12% by mass, or from about 0.3% by mass to about 10% by mass, or from about 0.5% by mass to about 8% by mass, or from about 0.6% by mass to about 6% by mass, or from about 0.7% by mass to about 5% by mass, or from about 0.8% by mass to about 3% by mass, or from about 0.85% by mass to about 2% by mass, or from about 0.9% by mass to about 1.5% by mass.

In some embodiments involving the contacting of a hybrid nucleating agent with an expandable material to obtain an expandable composite material, the contacting does not occur in the presence of a filler material. In other embodiments the contacting of a hybrid nucleating agent with an expandable material to obtain an expandable composite material occurs in the presence of a filler material that is a different material from the organic nucleating agent and the mineral nucleating agent.

In some embodiments a polymer composite may be further processed into a pelletized polymer composite, from which a solid foaming precursor may to obtained. For example, a pelletized polymer composite may be molded into a solid foaming precursor having specific dimensions by using a piston injection system such as a Haake MiniJet Pro piston injection system.

Foamed Polymers

Some embodiments of the present disclosure involve a process of producing a polymer foam in the presence of a hybrid nucleating agent, in which a polymer is contacted with the hybrid nucleating agent in the presence of a foaming agent to obtain the polymer foam. Other embodiments relate to a process of producing a polymer foam by introducing an organic nucleating agent and a mineral nucleating agent into a polymer composition to obtain a mixture, and foaming the mixture with a foaming agent to obtain a polymer foam. In some embodiments, polymer foams are obtained by saturating a solid foaming precursor (such as a pelletized polymer composite) with a physical blowing agent under high pressure conditions, followed by a controlled pressure release at an elevated temperature to cause foaming. In other embodiments, polymer foams are obtained by heating a composition containing a polymeric material, a hybrid nucleating agent and a chemical blowing agent to a temperature at which the chemical blowing agent undergoes decomposition of form a gas, and then cooling a resulting mixture at a controlled cooling rate to obtain a polymer foam.

In chemical foaming processes of the present disclosure, decomposition of a chemical blowing agent is used to produce gas and thereby generate a cellular structure in an expandable material. Chemical blowing agents may decompose by either an exothermic chemical reaction or by an endothermic chemical reaction. Exothermic chemical blowing agents, such as azodicarbonamide compounds, generate nitrogen gas ($N_2$) upon decomposition; whereas endothermic chemical blowing agents, such as sodium bicarbonate and citric acid, general carbon dioxide ($CO_2$) upon decomposition.

In some embodiments the foaming agent is a physical blowing agent which may be directly injected into a polymer melt or a polymer composite melt in the presence of a hybrid nucleating agent, leading to the formation of bubbles and a polymer foam having an enhanced cellular structure. In some embodiments the foaming agent is at least one physical blowing agent selected from the group consisting of a non-halogenated hydrocarbon, a halogenated hydrocarbon, carbon dioxide ($CO_2$), nitrogen ($N_2$), argon (Ar), helium (He) and water. In some embodiments the foaming agent is at least one selected from the group consisting of azodicarbonamide, diazoaminobenzene, azo-bis-isobutyronitrile, ammonium carbonate, sodium dicarbonate, nitrogen ($N_2$), carbon dioxide ($CO_2$), argon (Ar), helium (He), water, a chlorofluorocarbon (CFC), a hydrochlorofluorocarbon (HCFC), a low-boiling alcohol and a low-boiling ketone.

Foaming parameters may be varied widely in order to facilitation greater control of the morphology and resulting physical properties of the foamed materials. In embodiment involving the use of a physical blowing agent the saturation pressure may be varied from ambient pressure to about 100 MPa, at a saturation temperature ranging from the glass transition temperature of the polymer material to any temperature less than a decomposition temperature of the polymer material. Saturation times may range from a low as 1 second to as high as 4 weeks. In some embodiments the saturation time is set based upon the concentration of the gas in the foaming precursor—wherein the concentration of the gas may be altered to change the morphology and resulting physical properties of the foamed materials. The pressure release rate during the foaming may range from about 0.001 MPa per second to about 20 MPa per second, wherein the temperature during the pressure release (foaming) may also range from the glass transition temperature of the polymer material to any temperature less than a decomposition temperature of the polymer material. The foaming time may range from as low as about 0.1 second to as high as about 24 hours.

In some embodiments the foaming of an expandable material may occur in the presence of the hybrid nucleating agent and a secondary mineral that is different form the mineral nucleating agent. Secondary minerals may include, for example, filler materials as describe above. In other embodiments the secondary mineral may be selected from the group consisting of a kaolin, a bentonite, a talc, a chloritic talc, a milled expanded perlite, and a diatomite. In one non-limiting example, the foaming of an expandable material may occur in the presence of the hybrid nucleating agent, prepared using a wollastonite as the mineral nucleating agent, and a secondary mineral such as a talc.

In some embodiments a proportion of a polymer component in a polymer foam formed in the presence of a hybrid nucleating agent is greater than about 50% by mass relative to a total mass of the polymer foam. In other embodiments a proportion of the polymer component in the polymer is greater than about 55% by mass, or greater than about 60% by mass, or greater than about 65% by mass, or greater than about 70% by mass, or greater than about 75% by mass, or greater than about 80% by mass, or greater than about 85% by mass, or greater than about 90% by mass, or greater than about 92% by mass, or greater than about 95% by mass, or greater than about 96% by mass, or greater than about 97% by mass, or greater than about 98% by mass, or greater than about 98.5% by mass, or greater than about 99% by mass, or greater than about 99.5% by mass, or greater than about 99.7% by mass, relative to a total mass of the polymer foam.

Some embodiments of the present disclosure relate to a foamed material composed of (1) a cellular matrix comprising an expandable material, and (2) a mineral matrix of particles comprising a hybrid nucleating agent dispersed in the cellular matrix. In some embodiments the foamed material has a cell density ($N_f$) of equal to or greater than about 1.5E+09 cells/cm$^3$, based on a total volume of the foamed material, and the foamed material has an average cell diameter ($\varphi$) of less than or equal to about 6.0 μm. In other embodiments the foamed material has a cell density ($N_f$) of equal to or greater than about 2.9E+09 cells/cm$^3$, based on a total volume of the foamed material, and the foamed material has an average cell diameter ($\varphi$) of less than or equal to about 5.0 μm.

A mineral content of the mineral matrix in foamed materials of the present disclosure may range from about 0.001% by mass to about 20% by mass, relative to a total mass of the foamed material. In other embodiments a mineral content of the mineral matrix in the foamed material ranges from about 0.01% by mass to about 15% by mass, or from about 0.1% by mass to about 13% by mass, or from about 0.2% by mass to about 12% by mass, or from about 0.3% by mass to about 10% by mass, or from about 0.5% by mass to about 8% by mass, or from about 0.6% by mass to about 6% by mass, or from about 0.7% by mass to about 5% by mass, or from about 0.8% by mass to about 3% by mass, or from about 0.85% by mass to about 2% by mass, or from about 0.9% by mass to about 1.5% by mass, relative to a total mass of the foamed material.

Foamed materials of the present disclosure include closed-cell forms and open-cell forms obtained by foaming expandable materials in the presence of a hybrid nucleating agent. Whereas the morphology and cellular density of closed-cell foamed materials may be controlled based on the chemical and physical structure of the hybrid nucleating agent, in open-cell foamed materials it is expected that the rate and extent of bubble formation may also be controlled using hybrid nucleating agents of the present disclosure to prepare unique materials. For example, it is expected that the use of hybrid nucleating agents of the present disclosure in the preparation of open-cell membrane materials may impart greater control over membrane morphology and filtering characteristics.

Cellular Amplification Method

Some embodiments of the present disclosure involve a method for amplifying cell density of a foamed product by foaming an expandable material in the presence of a hybrid nucleating agent to obtain a foamed product having an amplified cell density. As explained above, a hybrid nucleating agent comprises an organic nucleating agent localized on at least a portion of a surface of a mineral nucleating agent.

One measure of amplification is described herein as an "amplification ratio," which is defined as a ratio of a cell density ($N_f$) of a foamed product, obtained by foaming an expandable material in the presence of a hybrid nucleating agent, divided by a cell density ($N_f$) of a cellular product, obtained by foaming the same expandable material in the presence of the mineral nucleating agent used to form the hybrid nucleating agent. Thus, the amplification ratio is the quotient of the amplified cell density ($N_f$) of a foamed product of the present disclosure over a cell density ($N_f$) of a corresponding cellular product obtained in the presence of a mineral nucleating agent with no organic nucleating agent localized on the surface of the mineral nucleating agent.

In some embodiments the amplification ratio is greater than 1:1. In other embodiments the amplification ratio is at least 2:1, or at least 5:1, or at least 10:1, or at least 20:1, or at least 35:1, or at least 50:1, or at least 70:1, or at least 85:1, or at least 100:1.

Some embodiments relate to a method for amplifying cell density of a foamed product, wherein: (i) the amplification ratio is at least about 40:1; (ii) the foamed product has a cell density ($N_f$) of equal to or greater than about 1.5E+09 cells/cm$^3$, based on a volume of the foamed product; and (iii) the foamed product has an average cell diameter ($\varphi$) of less than or equal to about 6.0 μm. In other embodiments the method for amplifying cell density of a foamed product is capable of producing a foamed product wherein: (i) the amplification ratio is at least about 70:1; (ii) the foamed product has a cell density ($N_f$) of equal to or greater than about 2.9E+09 cells/cm$^3$, based on a volume of the foamed product; and (iii) the foamed product has an average cell diameter ($\varphi$) of less than or equal to about 5.0 μm.

In some embodiments the size and density of cells (i.e., bubbles) within a polymer foam may be controlled by based on the chemical nature and physical form of the hybrid nucleating agent. As explained above, the chemical nature and physical disposition of the organic nucleating agent on the surface of the mineral nucleating agent can affect the morphology and cellular structure of a resulting polymer foam based on the mechanism of bubble formation.

Unless otherwise indicated herein, the cellular structure of the various foams described in this disclosure was studied using a HITACHI S-4300SE/N scanning electron microscope (SEM) from samples cryogenically fractured using liquid nitrogen and made conductive by sputter deposition of a thin layer of carbon. The average cell size ($\varphi$) and cell density ($N_f$) were directly obtained from low-magnification micrographs using the intercept counting method described in G. L. A. Sims and C. Khunniteekool, "Cell size measurement of polymeric foams," *Cellular Polymers*, 13, 137 (1994). In particular, cell density, $N_f$, was determined according to the following equation:

$$N_f = \left(\frac{n}{A}\right)^{\frac{3}{2}} \cdot \left(\frac{\rho_s}{\rho_f}\right)$$

where n is the number of cells per area A (in cm$^2$), and $\rho_s$ and $\rho_f$ are respectively the solid and foam densities.

In some embodiments polymer foams obtained in the presence of a hybrid nucleating agent may have relative densities, compared to the respective unfoamed base materials, ranging from about 0.20 to about 0.90. In other embodiments the relative densities of polymer foams obtained in the presence of a hybrid nucleating agent may range from about 0.25 to about 0.40, or from about 0.40 to about 0.60, or from about 0.60 to about 0.80, or from about 0.25 to about 0.35, or from about 0.35 to about 0.50, or from about 0.50 to about 0.75, or from about 0.60 to about 0.75.

In some embodiments polymer foams obtained in the presence of a hybrid nucleating agent may have an average cell size ($\varphi$) of less than or equal to about 450 μm. In other embodiments polymer foams obtained in the presence of a hybrid nucleating agent may have an average cell size ($\varphi$) of less than or equal to about 400 μm, or less than or equal to about 350 μm, or less than or equal to about 300 μm, or less than or equal to about 250 μm, or less than or equal to about 200 μm, or less than or equal to about 150 μm, or less than or equal to about 100 μm, or less than or equal to about 50 μm, or less than or equal to about 25 μm, or less than 20 μm, or less than 15 μm, or less than 10 μm, or less than 7.5 μm, or less than 6 μm, or less than 5 μm, or less than 4 μm, or less than 3 μm, or less than 2 μm.

In some embodiments polymer foams obtained in the presence of a hybrid nucleating agent may have an average cell size ($\varphi$) ranging from about 1 μm to about 450 μm. For example, the polymer foam may have an average cell size ($\varphi$) in a range from about 100 μm to about 400 μm, or from about 100 μm to about 300 μm, or from about 50 μm to about 250 μm, or from about 10 μm to about 100 μm, or from about 200 μm to about 400 μm, or from about 200 μm to about 300 μm, or from about 100 μm to about 150 μm, or from about 10 μm to about 50 μm, or from about 50 μm to about 100 μm, or from about 25 μm to about 50 μm, or from about 10 μm to about 25 μm, or from about 1 μm to about 10 μm.

In some embodiments polymer foams obtained in the presence of a hybrid nucleating agent may have an average cell size ($\varphi$p) that is less than a critical defect size of the polymer composition.

In some embodiments polymer foams obtained in the presence of a hybrid nucleating agent may have a cell density ($N_f$) of greater than or equal to about $3.0 \times 10^7$ per $cm^3$. In other embodiments polymer foams obtained in the presence of a hybrid nucleating agent may have a cell density ($N_f$) of greater than or equal to about $1.0 \times 10^7$ per $cm^3$, or greater than or equal to about $5.0 \times 10^7$ per $cm^3$, or greater than or equal to about $1.0 \times 10^8$ per $cm^3$, or greater than or equal to about $5.0 \times 10^8$ per $cm^3$, or greater than or equal to about $1.0 \times 10^9$ per $cm^3$, or greater than or equal to about $1.5 \times 10^9$ per $cm^3$, or greater than or equal to about $2.0 \times 10^9$ per $cm^3$, or greater than or equal to about $2.5 \times 10^9$ per $cm^3$, or greater than or equal to about $3.0 \times 10^9$ per $cm^3$, greater than or equal to about $3.5 \times 10^9$ per $cm^3$, greater than or equal to about $4.0 \times 10^9$ per $cm^3$, or greater than or equal to about $4.5 \times 10^9$ per $cm^3$, or greater than or equal to about $5.0 \times 10^9$ per $cm^3$.

In some embodiments polymer foams obtained in the presence of a hybrid nucleating agent may have a cell density ($N_f$) ranging from about $3.0 \times 10^7$ per $cm^3$ to about $7.5 \times 10^9$ per $cm^3$. In other embodiments polymer foams obtained in the presence of a hybrid nucleating agent may have a cell density ($N_f$) ranging from about $5.0 \times 10^8$ per $cm^3$ to about $6.0 \times 10^9$ per $cm^3$, from about $7.0 \times 10^8$ per $cm^3$ to about $5.0 \times 10^9$ per $cm^3$, from about $1.0 \times 10^9$ per $cm^3$ to about $4.0 \times 10^9$ per $cm^3$, from about $1.5 \times 10^9$ per $cm^3$ to about $3.5 \times 10^9$ per $cm^3$, from about $2.0 \times 10^9$ per $cm^3$ to about $3.0 \times 10^9$ per $cm^3$.

Embodiments

Embodiment [1] of the present disclosure relates to a process of producing a polymer foam, the process comprising: dispersing an organic nucleating agent in a dispersing medium to obtain an additive dispersion; contacting the additive dispersion with a mineral nucleating agent to obtain a hybrid nucleating agent comprising the organic nucleating agent localized on at least a portion of a surface of the mineral nucleating agent; and contacting the hybrid nucleating agent with a polymer in the presence of a foaming agent to obtain a polymer foam.

Embodiment [2] of the present disclosure relates to the process of Embodiment [1], wherein a mass ratio of the organic nucleating agent to the mineral nucleating agent ranges from about 0.001:99.999 to about 50:50.

Embodiment [3] of the present disclosure relates to the process of Embodiment [1] or Embodiment [2], wherein a mass ratio of the organic nucleating agent to the mineral nucleating agent ranges from about 0.1:99.9 to about 10:90.

Embodiment [4] of the present disclosure relates to [the process of one of Embodiments [1]-[3], wherein a mineral content of the hybrid nucleating agent, relative a mixture of the hybrid nucleating agent with the polymer, ranges from about 0.001% by mass to about 20% by mass.

Embodiment [5] of the present disclosure relates to the process of one of Embodiments [1]-[4], wherein a mineral content of the hybrid nucleating agent, relative a mixture of the hybrid nucleating agent with the polymer, ranges from about 0.1% by mass to about 5% by mass.

Embodiment [6] of the present disclosure relates to the process of one of Embodiments [1]-[5], wherein the hybrid nucleating agent comprises a coating of the organic nucleating agent on the surface of the mineral nucleating agent.

Embodiment [7] of the present disclosure relates to the process of one of Embodiments [1]-[6], wherein the hybrid nucleating agent comprises the organic nucleating agent bonded to the surface of the mineral nucleating agent.

Embodiment [8] of the present disclosure relates to the process of one of Embodiments [1]-[7], comprising contacting the hybrid nucleating agent with the polymer in the presence of the foaming agent and a filler material to obtain the polymer foam, wherein the filler material is a different material from the organic nucleating agent and the mineral nucleating agent.

Embodiment [9] of the present disclosure relates to the process of one of Embodiments [1]-[8], wherein the contacting of the additive dispersion with the mineral nucleating agent to obtain the hybrid nucleating agent does not occur in the presence of a filler material.

Embodiment [10] of the present disclosure relates to the process of one of Embodiments [1]-[9], wherein the contacting of the hybrid nucleating agent with the polymer to obtain the polymer foam does not occur in the presence of a filler material.

Embodiment [11] of the present disclosure relates to the process of one of Embodiments [1]-[10], wherein the organic nucleating agent is a crystalline organic nucleating agent.

Embodiment [12] of the present disclosure relates to the process of one of Embodiments [1]-[11], wherein the organic nucleating agent is at least one selected from the group consisting of a salt of a carboxylic acid, an organic sulfonate salt, a carboxylic acid amide and a salt of an organic phosphoric compound.

Embodiment [13] of the present disclosure relates to the process of one of Embodiments [1]-[12], wherein the organic nucleating agent is an amorphous organic nucleating agent.

Embodiment [14] of the present disclosure relates to the process of one of Embodiments [1]-[13], wherein the organic nucleating agent is at least one selected from the group consisting of aluminum dibenzoate, barium benzoate, barium stearate, benzylidene sorbitol, a derivative of benzylidene sorbitol, calcium benzoate, calcium montanate, calcium myristate, calcium octacosanoate, calcium oxalate, calcium stearate, erucic acid amide, ethylene bis-lauric acid amide, hydroxystearic acid amide, lithium benzoate, lithium dibenzoate, lithium stearate, lithium terephthalate, magnesium benzoate, magnesium stearate, 2,2-methylbis(4,6-di-t-butylphenyl)sodium, palmitic acid amide, potassium benzoate, potassium dibenzoate, potassium laurate, potassium myristate, potassium salicylate, potassium stearate, potassium terephthalate, sodium benzoate, sodium cyclohexane carboxylate, sodium laurate, sodium-2,2'-methylenebis(4,6-di-t-butylphenyl) phosphate, sodium montanate, sodium myristate, sodium β-naphthalate, sodium octacosanoate, sodium salicylate, sodium sulfoisophthalate, sodium stearate, sodium terephthalate, sodium p-toluene sulfonate, sodium toluoylate, stearic acid amide, tris(t-butylamide) trimesate and zinc salicylate.

Embodiment [15] of the present disclosure relates to the process of one of Embodiments [1]-[14], wherein the mineral nucleating agent is an inorganic mineral particulate or an inorganic mineral fiber.

Embodiment [16] of the present disclosure relates to the process of one of Embodiments [1]-[15], wherein the mineral nucleating agent is a porous inorganic mineral.

Embodiment [17] of the present disclosure relates to the process of one of Embodiments [1]-[16], wherein the mineral nucleating agent is at least one selected from the group consisting of a mineral aggregate, a mineral fiber, a natural clay, a synthetic clay, a glass bead, a talc and a mica.

Embodiment [18] of the present disclosure relates to [18] Embodiments of the present disclosure include the process of one of Embodiments [1]-[17], wherein the mineral nucleating agent is at least one selected from the group consisting of a kaolin, a bentonite, a chloritic talc, a milled expanded perlite, a diatomite, a talc, a mica, a wollastonite, a titania and a silica.

Embodiment [19] of the present disclosure relates to the process of one of Embodiments [1]-[18], wherein the mineral nucleating agent is at least one selected from the group consisting of a metal oxide, a metal silicate, a metal sulfate, a metal carbonate, an metal oxosulfate, a metal phosphate and a metal phosphonate.

Embodiment [20] of the present disclosure relates to the process of one of Embodiments [1]-[19], wherein the mineral nucleating agent is at least one selected from the group consisting of a titanium dioxide, a silicon dioxide, a calcium silicate and a calcium sulfate.

Embodiment [21] of the present disclosure relates to the process of one of Embodiments [1]-[20], wherein the mineral nucleating agent is a silicate or an alumino-silicate of an alkali or alkaline earth metal.

Embodiment [22] of the present disclosure relates to the process of one of Embodiments [1]-[21], wherein the mineral nucleating agent comprises at least one selected from the group consisting of calcium silicate, magnesium silicate, beryllium silicate, strontium silicate and barium silicate.

Embodiment [23] of the present disclosure relates to the process of one of Embodiments [1]-[22], wherein the polymer is a thermoplastic polymer or a thermoset polymer.

Embodiment [24] of the present disclosure relates to the process of one of Embodiments [1]-[23], wherein the polymer comprises at least one selected from the group consisting of a polyolefin, a polyamide, a polycarbonate, a polyurethane, a polyester, a polyacrylate, and copolymers and blends thereof.

Embodiment [25] of the present disclosure relates to the process of one of Embodiments [1]-[24], wherein the polymer comprises at least one selected from the group consisting of a polystyrene, a polyethylene, a polystyrene, a polyamide, a polyurethane, a poly(ethyl vinyl acetate), a polyethylene terephthalate, and copolymers and blends thereof.

Embodiment [26] of the present disclosure relates to the process of one of Embodiments [1]-[25], wherein the foaming agent is a chemical or physical blowing agent.

Embodiment [27] of the present disclosure relates to the process of one of Embodiments [1]-[26], wherein the foaming agent is a gas, water or an exothermic blowing agent.

Embodiment [28] of the present disclosure relates to the process of one of Embodiments [1]-[27], wherein the foaming agent is selected from the group consisting of water, an inert gas, carbon dioxide, and an organic gas.

Embodiment [29] of the present disclosure relates to the process of one of Embodiments [1]-[28], wherein the dispersing medium is an aqueous dispersing medium.

Embodiment [30] of the present disclosure relates to the process of one of Embodiments [1]-[29], wherein the dispersing medium comprises water and at least one organic solvent, such that a ratio of the water to the at least one organic solvent ranges from 0.1:99.9 to 99.9:0.1.

Embodiment [31] of the present disclosure relates to the process of one of Embodiments [1]-[30], wherein the dispersing medium comprises water and at least one organic solvent selected from the group consisting of an ether solvent, an alcohol solvent, an ester solvent, a ketone solvent, an aromatic hydrocarbon solvent, an aliphatic hydrocarbon solvent and a polar aprotic solvent.

Embodiment [32] of the present disclosure relates to the process of one of Embodiments [1]-[31], comprising: melt-mixing the hybrid nucleating agent with the polymer, and extruding a resulting mixture to obtain a polymer-nucleating agent composite; and foaming the polymer-nucleating agent composite with a physical blowing agent.

Embodiment [33] of the present disclosure relates to the process of one of Embodiments [1]-[32], wherein the polymer foam has a cell density ($N_f$) of equal to or greater than about 1.5E+09 cells/cm$^3$, based on a volume of the polymer foam.

Embodiment [34] of the present disclosure relates to the process of one of Embodiments [1]-[33], wherein the polymer foam has an average cell diameter ($\varphi$) of less than or equal to about 6.0 µm.

Embodiment [35] of the present disclosure relates to a foamed product obtained by the process of one of Embodiments [1]-[34].

Embodiment [36] of the present disclosure relates to the foamed product of Embodiment [35], wherein the foamed product has a cell density ($N_f$) of equal to or greater than about 1.5E+09 cells/cm$^3$, based on a volume of the foamed product.

Embodiment [37] of the present disclosure relates to the foamed product of Embodiment [35] or [36], wherein the foamed product has an average cell diameter (p) of less than or equal to about 6.0 µm.

Embodiment [38] of the present disclosure relates to a process of producing a polymer foam, the process comprising foaming a polymer in the presence of a hybrid nucleating agent, wherein the hybrid nucleating agent comprises an inorganic material and an organic nucleating agent coating at least a portion of the inorganic material.

Embodiment [39] of the present disclosure relates to the process of Embodiment [38], wherein the organic nucleating agent is at least one selected from the group consisting of a salt of a carboxylic acid, an organic sulfonate salt, a carboxylic acid amide and a salt of an organic phosphoric compound.

Embodiment [40] of the present disclosure relates to the process of Embodiment [38] or Embodiment [39], wherein the organic nucleating agent is a crystalline organic nucleating agent.

Embodiment [41] of the present disclosure relates to the process of one of Embodiments [38]-[40], wherein the inorganic material is at least one selected from the group consisting of a metal oxide, a metal silicate, a metal sulfate, a metal carbonate, an metal oxosulfate, a metal phosphate and a metal phosphonate.

Embodiment [42] of the present disclosure relates to the process of one of Embodiments [38]-[41], wherein the inorganic material is at least one selected from the group consisting of a kaolin, a bentonite, a chloritic talc, a milled expanded perlite, a diatomite, a talc, a mica, a wollastonite, a titania and a silica.

Embodiment [43] of the present disclosure relates to the process of one of Embodiments [38]-[42], wherein the polymer is a thermoplastic polymer or a thermoset polymer.

Embodiment [44] of the present disclosure relates to the process of one of Embodiments [38]-[43], wherein the polymer comprises at least one selected from the group consisting of a polyolefin, a polyamide, a polycarbonate, a polyurethane, a polyester, a polyacrylate, and copolymers and blends thereof.

Embodiment [45] of the present disclosure relates to the process of one of Embodiments [38]-[44], wherein the polymer comprises at least one selected from the group consisting of a polystyrene, a polyethylene, a polystyrene, a polyamide, a polyurethane, a poly(ethyl vinyl acetate), a polyethylene terephthalate, and copolymers and blends thereof.

Embodiment [46] of the present disclosure relates to the process of one of Embodiments [38]-[45], wherein the foaming occurs in the presence of a chemical or physical blowing agent.

Embodiment [47] of the present disclosure relates to the process of one of Embodiments [38]-[46], wherein the foaming occurs in the presence of a blowing agent is selected from the group consisting of water, an inert gas, carbon dioxide, and an organic gas.

Embodiment [48] of the present disclosure relates to the process of one of Embodiments [38]-[47], wherein the hybrid nucleating agent is obtained by evaporating a dispersion of the organic nucleating agent and the inorganic material in a dispersion medium comprising at least two solvents.

Embodiment [49] of the present disclosure relates to the process of Embodiment [48], wherein the dispersion medium is an aqueous dispersion medium comprising at least one organic solvent, such that a ratio of water to the at least one organic solvent ranges from 0.1:99.9 to 99.9:01.

Embodiment [50] of the present disclosure relates to the process of one of Embodiments [38]-[49], further comprising: melt-mixing the hybrid nucleating agent with the polymer, and extruding a resulting mixture to obtain a polymer-nucleating agent composite; and foaming the polymer-nucleating agent composite with a physical blowing agent to obtain a polymer foam.

Embodiment [51] of the present disclosure relates to the process of Embodiment [50], wherein the polymer foam has a cell density ($N_f$) of equal to or greater than about 1.5E+09 cells/cm$^3$, based on a volume of the polymer foam.

Embodiment [52] of the present disclosure relates to the process of Embodiment [50] or Embodiment [51], wherein the polymer foam has an average cell diameter ($\varphi$) of less than or equal to about 6.0 µm.

Embodiment [53] of the present disclosure relates to a foamed product obtained by the process of one of Embodiments [38]-[52].

Embodiment [54] of the present disclosure relates to the foamed product of the Embodiment [53], wherein the foamed product has a cell density ($N_f$) of equal to or greater than about 1.5E+09 cells/cm$^3$, based on a volume of the foamed product.

Embodiment [55] of the present disclosure relates to the foamed product of Embodiment [53] or Embodiment [54], wherein the foamed product has an average cell diameter ($\varphi$) of less than or equal to about 6.0 µm.

Embodiment [56] of the present disclosure relates to a method for amplifying cell density of a foamed product, the method comprising foaming an expandable material in the presence of a hybrid nucleating agent to obtain a foamed product having an amplified cell density, wherein: the hybrid nucleating agent comprises an organic nucleating agent localized on at least a portion of a surface of a mineral nucleating agent; and a ratio of the amplified cell density to a cell density of a cellular product obtained by foaming the expandable material in the presence of the mineral nucleating agent is at least about 5:1.

Embodiment [57] of the present disclosure relates to the method of Embodiment [56], wherein: the ratio is at least about 40:1; the foamed product has a cell density ($N_f$) of equal to or greater than about 1.5E+09 cells/cm$^3$, based on a volume of the foamed product; and the foamed product has an average cell diameter ($\varphi$) of less than or equal to about 6.0 µm.

Embodiment [58] of the present disclosure relates to the method of Embodiment [56] or Embodiment [57], wherein: the ratio is at least about 70:1; the foamed product has a cell density ($N_f$) of equal to or greater than about 2.9E+09 cells/cm$^3$, based on a volume of the foamed product; and the foamed product has an average cell diameter ($\varphi$) of less than or equal to about 5.0 µm.

Embodiment [59] of the present disclosure relates to the method of one of Embodiments [56]-[58], wherein the hybrid nucleating agent comprises a coating of the organic nucleating agent on the surface of the mineral nucleating agent.

Embodiment [60] of the present disclosure relates to the method of one of Embodiments [56]-[59], wherein the hybrid nucleating agent comprising the organic nucleating agent bonded to the surface of the mineral nucleating agent.

Embodiment [61] of the present disclosure relates to the method of one of Embodiments [56]-[60], wherein a mass ratio of the organic nucleating agent to the mineral nucleating agent ranges from about 0.1:99.9 to about 10:90.

Embodiment [62] of the present disclosure relates to the method of one of Embodiments [56]-[62], wherein a mineral content of the hybrid nucleating agent, relative a mixture of the hybrid nucleating agent with the expandable material, ranges from about 0.1% by mass to about 5% by mass.

Embodiment [63] of the present disclosure relates to the method of one of Embodiments [56]-[62], wherein the organic nucleating agent is a crystalline organic nucleating agent.

Embodiment [64] of the present disclosure relates to the method of one of Embodiments [56]-[63], wherein the organic nucleating agent is at least one selected from the group consisting of a salt of a carboxylic acid, an organic sulfonate salt, a carboxylic acid amide and a salt of an organic phosphoric compound.

Embodiment [65] of the present disclosure relates to the method of one of Embodiments [56]-[64], wherein the mineral nucleating agent is at least one selected from the group consisting of a kaolin, a bentonite, a chloritic talc, a milled expanded perlite, a diatomite, a talc, a mica, a wollastonite, a titania and a silica.

Embodiment [66] of the present disclosure relates to the method of one of Embodiments [56]-[65], wherein the mineral nucleating agent is at least one selected from the group consisting of a titanium dioxide, a silicon dioxide, a calcium silicate and a calcium sulfate.

Embodiment [67] of the present disclosure relates to the method of one of Embodiments [56]-[66], wherein the expandable material comprises at least one selected from the group consisting of a polyolefin, a polyamide, a polycarbonate, a polyurethane, a polyester, a polyacrylate, and copolymers and blends thereof.

Embodiment [68] of the present disclosure relates to the method of one of Embodiments [56]-[67], wherein the foaming occurs in the presence of a chemical or physical blowing agent.

Embodiment [69] of the present disclosure relates to the method of one of Embodiments [56]-[68], wherein the foaming occurs in the presence of a blowing agent is selected from the group consisting of water, an inert gas, carbon dioxide, and an organic gas.

Embodiment [70] of the present disclosure relates to the method of one of Embodiments [56]-[69], wherein the hybrid nucleating agent is obtained by evaporating a dispersion of the organic nucleating agent and the mineral nucleating agent in a dispersion medium comprising at least two solvents.

Embodiment [71] of the present disclosure relates to the method of Embodiment [70], wherein the dispersion medium is an aqueous dispersion medium comprising at least one organic solvent, such that a ratio of water to the at least one organic solvent ranges from 0.1:99.9 to 99.9:01.

Embodiment [72] of the present disclosure relates to the method of one of Embodiments [56]-[71], further comprising: melt-mixing the hybrid nucleating agent with the expandable material, and extruding a resulting mixture to obtain a polymer-nucleating agent composite; and foaming the polymer-nucleating agent composite with a physical blowing agent to obtain the foamed product.

Embodiment [73] of the present disclosure relates to a hybrid nucleating agent, comprising: a mineral nucleating agent; and an organic nucleating agent coated on at least a portion of a surface of the mineral nucleating agent, wherein the hybrid nucleating agent is formed by dispersing the organic nucleating agent in a dispersing medium to obtain an additive dispersion, and contacting the additive dispersion with the mineral nucleating agent followed by an evaporation process to coat the surface of the mineral nucleating agent with the organic nucleating agent.

Embodiment [74] of the present disclosure relates to the hybrid nucleating agent of Embodiment [73], wherein the hybrid nucleating agent is formed by dispersing the organic nucleating agent in a dispersing medium to obtain an additive dispersion, and contacting the additive dispersion with the mineral nucleating agent followed by an evaporation process to coat the surface of the mineral nucleating agent with the organic nucleating agent.

Embodiment [75] of the present disclosure relates to the hybrid nucleating agent of one of Embodiments [73]-[74], wherein: the hybrid nucleating agent is obtained by evaporating the additive dispersion; and the dispersion medium is an aqueous dispersion medium comprising at least one organic solvent, such that a ratio of water to the at least one organic solvent ranges from 0.1:99.9 to 99.9:01.

Embodiment [76] of the present disclosure relates to the hybrid nucleating agent of one of Embodiments [73]-[75], wherein the organic nucleating agent is at least one selected from the group consisting of a salt of a carboxylic acid, an organic sulfonate salt, a carboxylic acid amide and a salt of an organic phosphoric compound.

Embodiment [77] of the present disclosure relates to the hybrid nucleating agent of one of Embodiments [73]-[76], wherein the organic nucleating agent is a crystalline organic nucleating agent.

Embodiment [78] of the present disclosure relates to the hybrid nucleating agent of one of Embodiments [73]-[77], wherein the mineral nucleating agent is at least one selected from the group consisting of a kaolin, a bentonite, a chloritic talc, a milled expanded perlite, a diatomite, a talc, a mica, a wollastonite, a titania and a silica.

Embodiment [79] of the present disclosure relates to the hybrid nucleating agent of one of Embodiments [73]-[78], wherein the mineral nucleating agent comprises at least one selected from the group consisting of calcium silicate, magnesium silicate, beryllium silicate, strontium silicate and barium silicate.

Embodiment [80] of the present disclosure relates to a process of producing a polymer foam, the process comprising: introducing an organic nucleating agent and a mineral nucleating agent into a polymer composition to obtain a mixture; and foaming the mixture with a foaming agent to obtain a polymer foam.

Embodiment [81] of the present disclosure relates to the process of Embodiment [80], comprising contacting an additive dispersion with the mineral nucleating agent to obtain the mixture, wherein the additive dispersion is formed by dispersing the organic nucleating agent in a dispersing medium.

Embodiment [82] of the present disclosure relates to the process of Embodiment [80] or Embodiment [81], wherein the mixture comprises a hybrid nucleating agent comprising the organic nucleating agent localized on at least a portion of a surface of the mineral nucleating agent.

Embodiment [83] of the present disclosure relates to the process of Embodiment [82], wherein the hybrid nucleating agent comprises a coating of the organic nucleating agent on at least the portion of the surface of the mineral nucleating agent.

Embodiment [84] of the present disclosure relates to the process of one of Embodiments [80]-[83], wherein the foaming agent is a gas.

Embodiment [85] of the present disclosure relates to the process of one of Embodiments [80]-[84], wherein the organic nucleating agent is at least one selected from the group consisting of a salt of a carboxylic acid, an organic sulfonate salt, a carboxylic acid amide and a salt of an organic phosphoric compound.

Embodiment [86] of the present disclosure relates to the process of one of Embodiments [80]-[85], wherein the organic nucleating agent is at least one selected from the group consisting of aluminum dibenzoate, barium benzoate, barium stearate, benzylidene sorbitol, a derivative of benzylidene sorbitol, calcium benzoate, calcium montanate, calcium myristate, calcium octacosanoate, calcium oxalate, calcium stearate, erucic acid amide, ethylene bis-lauric acid amide, hydroxystearic acid amide, lithium benzoate, lithium dibenzoate, lithium stearate, lithium terephthalate, magnesium benzoate, magnesium stearate, 2,2-methylbis(4,6-di-t-butylphenyl)sodium, palmitic acid amide, potassium benzoate, potassium dibenzoate, potassium laurate, potassium myristate, potassium salicylate, potassium stearate, potassium terephthalate, sodium benzoate, sodium cyclohexane carboxylate, sodium laurate, sodium-2,2'-methylenebis(4, 6-d i-t-butylphenyl) phosphate, sodium montanate, sodium myristate, sodium β-naphthalate, sodium octacosanoate, sodium salicylate, sodium sulfoisophthalate, sodium stearate, sodium terephthalate, sodium p-toluene sulfonate, sodium toluoylate, stearic acid amide, tris(t-butylamide) trimesate and zinc salicylate.

Embodiment [87] of the present disclosure relates to the process of one of Embodiments [80]-[86], wherein the mineral nucleating agent is at least one selected from the group consisting of a kaolin, a bentonite, a chloritic talc, a milled expanded perlite, a diatomite, a talc, a mica, a wollastonite, a titania and a silica.

Embodiment [88] of the present disclosure relates to a foamed product obtained by the process of one of Embodiments [80]-[87].

Embodiment [89] of the present disclosure relates to a foamed polymer, comprising: a cellular matrix comprising a polymer material; and a mineral matrix of particles comprising a hybrid nucleating agent dispersed in the cellular matrix, wherein the hybrid nucleating agent comprises an organic nucleating agent localized on at least a portion of a surface of an inorganic material.

Embodiment [90] of the present disclosure relates to the foamed polymer of Embodiment [89], wherein: the foamed polymer has a cell density ($N_f$) of equal to or greater than about 1.5E+09 cells/cm$^3$, based on a volume of the foamed polymer; and the foamed polymer has an average cell diameter ($\varphi$) of less than or equal to about 6.0 µm.

Embodiment [91] of the present disclosure relates to the foamed polymer of Embodiment [89] or Embodiment [90], wherein: the foamed polymer has a cell density ($N_f$) of equal to or greater than about 2.9E+09 cells/cm$^3$, based on a volume of the foamed product; and the foamed polymer has an average cell diameter ($\varphi$) of less than or equal to about 5.0 µm.

Embodiment [92] of the present disclosure relates to the foamed polymer of one of Embodiments [89]-[91], wherein the organic nucleating agent is at least one selected from the group consisting of a salt of a carboxylic acid, an organic sulfonate salt, a carboxylic acid amide and a salt of an organic phosphoric compound.

Embodiment [93] of the present disclosure relates to the foamed polymer of one of Embodiments [89]-[92], wherein the organic nucleating agent is at least one selected from the group consisting of aluminum dibenzoate, barium benzoate, barium stearate, benzylidene sorbitol, a derivative of benzylidene sorbitol, calcium benzoate, calcium montanate, calcium myristate, calcium octacosanoate, calcium oxalate, calcium stearate, erucic acid amide, ethylene bis-lauric acid amide, hydroxystearic acid amide, lithium benzoate, lithium dibenzoate, lithium stearate, lithium terephthalate, magnesium benzoate, magnesium stearate, 2,2-methylbis(4,6-di-t-butylphenyl)sodium, palmitic acid amide, potassium benzoate, potassium dibenzoate, potassium laurate, potassium myristate, potassium salicylate, potassium stearate, potassium terephthalate, sodium benzoate, sodium cyclohexane carboxylate, sodium laurate, sodium-2,2'-methylenebis(4,6-di-t-butylphenyl) phosphate, sodium montanate, sodium myristate, sodium β-naphthalate, sodium octacosanoate, sodium salicylate, sodium sulfoisophthalate, sodium stearate, sodium terephthalate, sodium p-toluene sulfonate, sodium toluoylate, stearic acid amide, tris(t-butylamide) trimesate and zinc salicylate.

Embodiment [94] of the present disclosure relates to the foamed polymer of one of Embodiments [89]-[93], wherein the mineral nucleating agent is at least one selected from the group consisting of a mineral aggregate, a mineral fiber, a natural clay, a synthetic clay, a glass bead, a talc and a mica.

Embodiment [95] of the present disclosure relates to the foamed polymer of one of Embodiments [89]-[95], wherein the mineral nucleating agent is at least one selected from the group consisting of a kaolin, a bentonite, a chloritic talc, a milled expanded perlite, a diatomite, a talc, a mica, a wollastonite, a titania and a silica.

Embodiment [96] of the present disclosure relates to a masterbatch, comprising a hybrid nucleating agent and a polymer, wherein the hybrid nucleating agent comprises a mineral material and an organic nucleating agent localized on at least a portion of a surface of the mineral material.

Embodiment [97] of the present disclosure relates to the masterbatch of Embodiment [96], wherein a proportion of the hybrid nucleating agent ranges from about 30% to about 90% by mass relative to a total mass of the masterbatch.

Embodiment [98] of the present disclosure relates to the masterbatch of Embodiments [96]-[97], wherein a proportion of the hybrid nucleating agent ranges from about 50% to about 70% by mass relative to a total mass of the masterbatch.

Embodiment [99] of the present disclosure relates to the masterbatch of Embodiments [96]-[98], wherein the hybrid nucleating agent is formed by dispersing the organic nucleating agent in a dispersing medium to obtain an additive dispersion, and contacting the additive dispersion with the mineral material followed by an evaporation process to coat the surface of the mineral material with the organic nucleating agent.

Embodiment [100] of the present disclosure relates to the masterbatch of Embodiments [96]-[99], wherein the organic nucleating agent is at least one selected from the group consisting of a salt of a carboxylic acid, an organic sulfonate salt, a carboxylic acid amide and a salt of an organic phosphoric compound.

Embodiment [101] of the present disclosure relates to the masterbatch of Embodiments [96]-[100], wherein the organic nucleating agent is a crystalline organic nucleating agent.

Embodiment [102] of the present disclosure relates to the masterbatch of Embodiments [96]-[101], wherein the mineral material is at least one selected from the group consisting of a kaolin, a bentonite, a chloritic talc, a milled expanded perlite, a diatomite, a talc, a mica, a wollastonite, a titania and a silica.

Examples

The following examples are provided for illustration purposes only and in no way limit the scope of the present disclosure. Embodiments of the present disclosure employ the use of different or additional components such as other organic nucleating agents, other mineral nucleating agents, other polymers and other materials capable of being foamed, other foaming agents, as well as additional components and additives. Embodiments of the present disclosure may also employ the use of different process conditions than the conditions illustrated below.

Study Overview

In the examples illustrated below, the cell size and distribution within polymer foams was controlled by foaming a polyester polymer in the presence of a hybrid nucleating agent composed of an organic nucleating agent localized on the surface of a mineral nucleating agent. Comparison studies illustrate that use of the hybrid nucleating agent as a cellular nucleating agent leads to a surprising amplification of the cell density of polymer foams, such that the cell density of a polymer foam may be amplified by a factor more than 70 fold compared to the use of a mineral nucleating agent as a heterogeneous nucleating agent.

Materials

Sodium benzoate in powder form, which was purchased from (Sigma-Aldrich), was used as the organic nucleating agent. A wollastonite ($CaSiO_3$) having a median particle size 7 µm measured by laser light scattering and a BET surface area 2.9 m$^2$/g), was purchased from NYCO Products Co., and was used as the mineral nucleating agent. PQB15-089, which is a polyethylene terephthalate (PET) resin having an inherent viscosity of 0.89, was purchased from PolyQuest, Inc., was used as the foamable polymer. Deionized water was used as a co-solvent of a dispersing medium, and isopropyl alcohol (reagent grade, >99.7%), which was purchased from Sigma-Aldrich, was used as a co-solvent of the dispersing medium. Nitrogen (N$_2$) gas having physical properties, which was purchased from AirGas, was used as a physical blowing agent.

Preparation of the Hybrid Nucleating Agents

Hybrid nucleating agents containing different mass ratios of the organic nucleating agent relative to the mineral nucleating agent were prepared in the following manner.

A 50:50 (vol/vol) mixture of water and isopropanol was prepared to form a water/isopropanol dispersing medium. Sodium benzoate (5 g) was then dispersed into 50 mL of the water/isopropanol dispersing medium to form an additive dispersion having a concentration of 10 w/v. %.

A hybrid nucleating agent A having a mass ratio of 2:98 was prepared by adding the additive dispersion to 150 g of wollastonite, and then blending the resulting mixture using an RK Labmaster Mixer at a rotation speed of 35 rpm (impeller rpm of 3500) for 10 minutes. After blending, the resulting dispersion was dried at 80° C. in air for 12 hours to obtain the hybrid nucleating agent A as a dry powder. The mass ratio of the sodium benzoate to the calcium silicate in the hybrid nucleating agent A was 2:98.

A hybrid nucleating agent B having a mass ratio of 10:90 was prepared by adding the additive dispersion to 150 g of wollastonite, and then blending the resulting mixture using an RK Labmaster Mixer at a rotation speed of 35 rpm (impeller rpm of 3500) for 10 minutes. After blending, the resulting dispersion was dried at 80° C. in air for 12 hours to obtain the hybrid nucleating agent B as a dry powder. The mass ratio of the sodium benzoate to the calcium silicate in the hybrid nucleating agent B was 10:90.

Preparation of PET Reference and PET-Mineral Composites

A series of pelletized samples were prepared, which included reference pellets formed of polyethylene terephthalate (PET) (Reference Example 1), comparative composite pellets formed of PET and wollastonite (Comparative Example 2), inventive composite pellets formed of PET and the hybrid nucleating agent A (Inventive Example 3), and an inventive composite pellets formed of PET and the hybrid nucleating agent B (Inventive Example 4).

The PET pellets of Reference Example 1 were prepared by melting and extruding PET using a co-rotating twin-screw extruder (Haake Rheomex PTW16). At the exit of a circular extrusion die, the extruded PET was cooled using a water bath (at 25° C.) and was pelletized to obtain the reference PET pellets of Reference Example 1.

The comparative composite pellets of Comparative Example 2 were prepared by mechanically mixing (3 g) of wollastonite with (300 g) of PET, and then performing melt-mixing of a resulting mixture using a co-rotating twin-screw extruder (Haake Rheomex PTW16) to fully homogenize and extrude the mixture into an extruded composite. At the exit of a circular extrusion die, the extruded composite was cooled using a water bath (at 25° C.) and was pelletized to obtain the comparative composite pellets of Comparative Example 2.

The inventive composite pellets of Inventive Example 3 were prepared by mechanically mixing (3 g) of the hybrid nucleating agent A (2:98 of sodium benzoate to calcium silicate) prepared above with (300 g) of PET, and then performing melt-mixing of a resulting mixture using a co-rotation twin-screw extruder (Haake Rheomex PTW16) to fully homogenize and extrude the mixture into an extruded composite. At the exit of a circular extrusion die, the extruded composite was cooled using a water bath (at 25° C.) and was pelletized to obtain the inventive composite pellets of Inventive Example 3.

The inventive composite pellets of Inventive Example 4 were prepared by mechanically mixing (3 g) of the hybrid nucleating agent B (10:98 of sodium benzoate to calcium silicate) prepared above with (300 g) of PET, and then performing melt-mixing of a resulting mixture using a co-rotation twin-screw extruder (Haake Rheomex PTW16) to fully homogenize and extrude the mixture into an extruded composite. At the exit of a circular extrusion die, the extruded composite was cooled using a water bath (at 25° C.) and was pelletized to obtain the inventive composite pellets of Inventive Example 2.

All of the extrusions described above were carried out at extruder screw speeds of 250 rpm, under identical temperature conditions summarized in the extrusion temperature profile shown in Table 1 below.

TABLE 1

Extrusion temperature profile for melt-mixing with twin-screw extruder

| Extrusion Parameters | Temperature (° C.) |
|---|---|
| T1 (throat) | 250 |
| T2 | 250 |
| T3 | 290 |
| T4 | 290 |
| T5 | 290 |
| T6 | 290 |
| T7 | 290 |
| T8 | 290 |
| T9 | 290 |
| T10 (die) | 290 |

Average mineral contents for the pelletized materials described above were determined in each case by calcining three 5 gram test samples of the respective pellets at 600° C. according to the protocol of UNE-EN ISO 3451-1. Table 2 below shows the resulting average mineral contents for the pelletized materials of the Reference Example 1, Comparative Example 2, Inventive Example 3 and Inventive Example 4.

TABLE 2

Mineral contents of pelletized materials as determined according to UNE-EN ISO 3451-1

| Sample | Material | Mineral Content (wt. %) |
|---|---|---|
| Reference Example 1 | PET | 0 |
| Comparative Example 2 | PET + Calcium Silicate | 1.0 |
| Inventive Example 3 | PET + Sodium Benzoate:Calcium Silicate (2:98) | 1.0 |
| Inventive Example 4 | PET + Sodium Benzoate:Calcium Silicate (10:90) | 1.0 |

Preparation of Solid Foaming Precursors

The pelletized materials of Reference Example 1, Comparative Example 2, Inventive Example 3 and Inventive Example 4 were molded into solid foaming precursors by forming the respective pelletized materials into discs having a thickness of 1.7 mm and a diameter of 34.5 mm using a Haake MiniJet Pro piston injection system. The molding conditions are summarized in Table 3 below.

TABLE 3

Solid foaming precursor batch injection molding conditions

| Cylinder Temperature (° C.) | Mold Temperature (° C.) | Injection Pressure (psi) | Injection Time (s) |
|---|---|---|---|
| 285 | 25 | 700 | 3 |

Preparation of Polymer Foams

The solid foaming precursors of Reference Example 1, Comparative Example 2, Inventive Example 3 and Inventive Example 4 were foamed using a two-step gas dissolution batch-foaming process using nitrogen ($N_2$) gas as a physical blowing agent. Foams were obtained by saturating solid foaming precursor discs under $N_2$ in a high-pressure vessel at 20° C. at 17.5 MPa for 112 hours until the discs contained 0.2 wt. % of dissolved $N_2$, followed by controlled pressure release at a rate of 5 MPa/s and foaming at 150° C. for 10 seconds in a silicone oil bath.

Foam Characterization

The materials of Reference Example 1, Comparative Example 2, Inventive Example 3 and Inventive Example 4 were measured in terms of their unfoamed densities, foamed densities, relative densities, cell diameters ($\varphi$) and cell densities ($N_f$). The densities of the various materials (foamed and unfoamed) were measured according to the protocol of ISO 845, without removing the outer skins of the foamed specimens generated during the $N_2$-foaming process. The cellular structures of the various foams were studied using a HITACHI S-4300SE/N scanning electron microscope (SEM) from samples cryogenically fractured using liquid nitrogen and made conductive by sputter deposition of a thin layer of gold. The average cell diameters ($\varphi$) and cell densities ($N_f$) of the foams were measured directly from low-magnification micrographs using the intercept counting method.

Tables 4 below summarizes the density characteristics of the foamed and unfoamed materials of Reference Example 1, Comparative Example 1. Inventive Example 3 and Inventive Example 4.

TABLE 4

Characteristics of foamed and unfoamed materials of Reference Example 1, Comparative Example 2, Inventive Example 3 and Inventive Example 4

| Sample | Material | Mineral Content (wt. %) | Unfoamed Density (g/cm³) | Foamed Density (g/cm3) | Relative Density |
|---|---|---|---|---|---|
| Reference Example 1 | PET | 0 | 1.30 | 1.19 | 0.91 |
| Comparative Example 2 | PET + Calcium Silicate | 1.0 | 1.33 | 1.19 | 0.89 |
| Inventive Example 3 | PET + Sodium Benzoate:Calcium Silicate (2:98) | 1.0 | 1.32 | 1.05 | 0.80 |
| Inventive Example 4 | PET + Sodium Benzoate:Calcium Silicate (10:90) | 1.0 | 1.33 | 1.06 | 0.79 |

As illustrated in Table 4 above, the relative densities of the inventive polymer foams of Inventive Example 3 (0.80) and Inventive Example 4 (0.79) are significantly lower than the relative densities of the Reference Example 1 (0.91) and the Comparative Example 2 (0.89). Therefore, compounding of PET with the hybrid nucleating agents A and B greatly reduces the relative densities of polymer foams obtained by a two-step gas dissolution batch-foaming process with $N_2$ gas, as compared to a polymer foam of PET obtained without a heterogeneous nucleation agent (Reference Example 1). Surprisingly, the compounding of PET with the hybrid nucleating agents A and B also greatly reduced the relative densities of polymer foams obtained by the two-step gas dissolution batch-foaming process with $N_2$ gas, as compared to a polymer foam of PET obtained using heterogeneous nucleation with a mineral nucleating agent ($CaSiO_3$) alone (Comparative Example 2). From this result it is clear that use of the hybrid nucleating agents A and B as heterogeneous nucleating agents significantly increases the degree of foaming for a given mineral content (1.0 wt. %), relative to the same mineral content (1.0 wt. %) of the mineral nucleating agent as a heterogeneous nucleating agent.

Tables 5 below summarizes the characteristics of the polymer foams of Reference Example 1, Comparative Example 1, Inventive Example 3 and Inventive Example 4. The average cell diameters ($\varphi$) and cell densities ($N_f$) of the polymer foams in Table 5 were measured directly from low-magnification micrographs using the intercept counting method.

TABLE 5

Characteristics of polymer foams of Reference Example 1, Comparative Example 2, Inventive Example 3 and Inventive Example 4

| Sample | Material | Mineral Content (wt. %) | Relative Density | Average Cell Diameter ($\varphi$) (μm) | Cell Density (Nf) (cells/cm³) |
|---|---|---|---|---|---|
| Reference Example 1 | PET | 0 | 0.91 | 167.8 | 8.98E+04 |
| Comparative Example 2 | PET + Calcium Silicate | 1.0 | 0.89 | 28.0 | 4.11E+07 |
| Inventive Example 3 | PET + Sodium Benzoate:Calcium Silicate (2:98) | 1.0 | 0.80 | 5.9 | 1.57E+09 |
| Inventive Example 4 | PET + Sodium Benzoate:Calcium Silicate (10:90) | 1.0 | 0.79 | 5.0 | 2.93E+09 |

Figure 2:
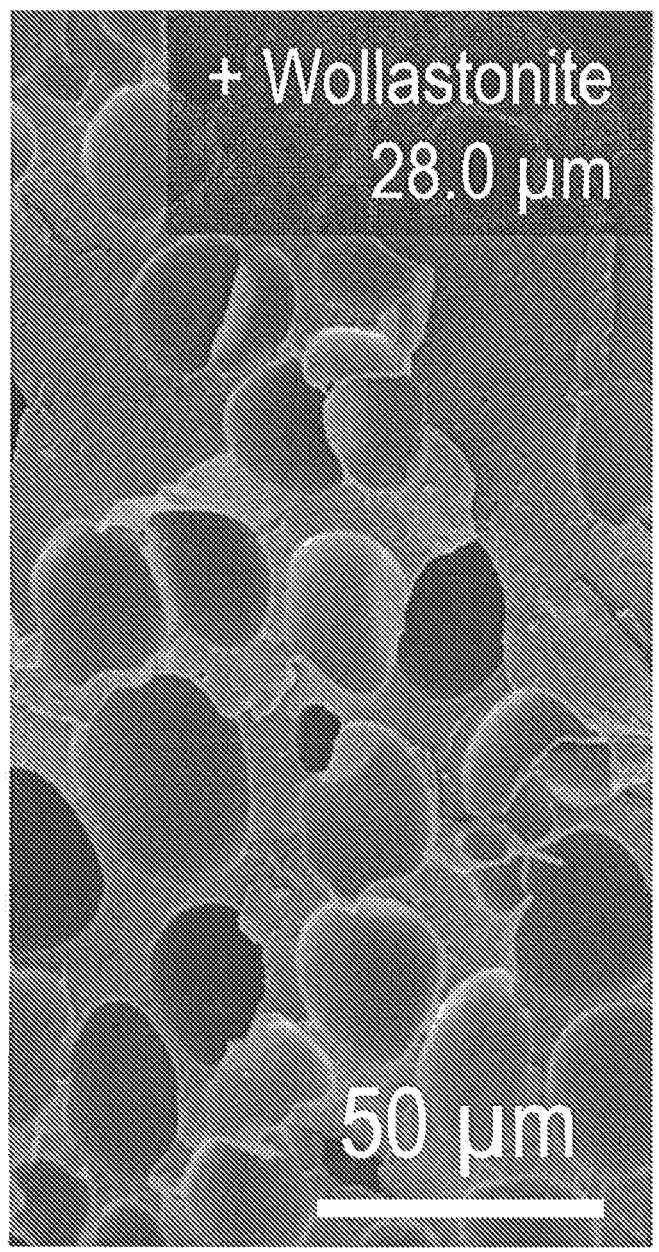
FIG. 2 is a SEM photograph showing the cross section of a polymer foam formed from PET in the presence of Wollastonite at a mineral content of 1.0 wt. %.
Figure 3:
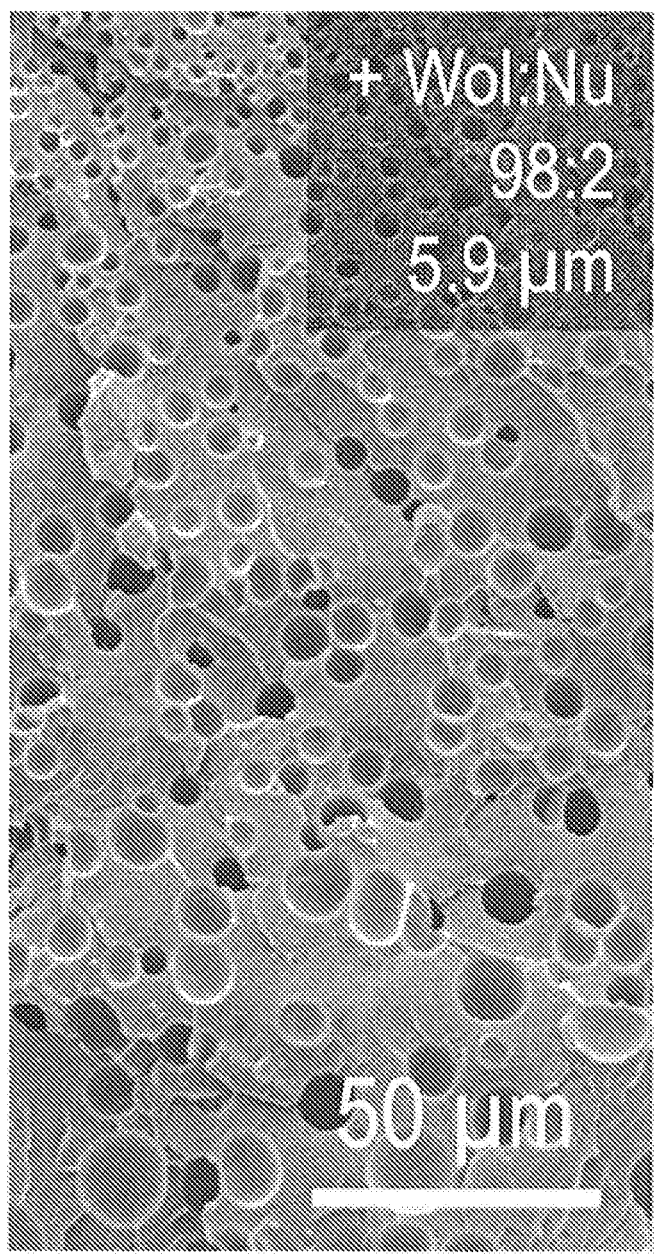
FIG. 3 is a SEM photograph showing the cross section of a polymer foam formed from PET in the presence of a hybrid nucleating agent at a mineral content of 1.0 wt. %, in which the hybrid nucleating agent is formed of sodium benzoate and Wollastonite in a mass ratio of 98:2.

As illustrated in Table 5 above and in FIGS. 1-3, the average cell diameters ($\varphi$) and cell densities (Nf) of PET foams are also profoundly affected by the use of the hybrid nucleating agents A and B as heterogeneous nucleating agents.

Comparing the average cell diameters ($\varphi$) of the polymer foam of Inventive Examples 3 versus the polymer foam of the Reference Example 1 shows that use of the hybrid nucleating agent A reduces the average cell diameter by a factor of about 28 (167.8/5.9). Increasing the mass ratio of the sodium benzoate from 2:98 in the hybrid nucleating agent A to 10:90 in the hybrid nucleating agent B further reduces the average cell diameter ($\varphi$) from the factor of about 28 in the Inventive Example 3 to a factor of about 34 (167.8/5.0) in the Inventive Example 4.

Surprisingly, the compounding of PET with the hybrid nucleating agents A and B also greatly reduced the average cell diameter ($\varphi$) of the polymer foams, as compared to a polymer foam obtained by heterogeneous nucleation with a mineral nucleating agent ($CaSiO_3$) alone. The average cell diameter ($\varphi$) of the polymer foam of Inventive Example 3 is reduced by a factor of about 5 (28.0/5.9) relative to the average cell diameter ($\varphi$) of the polymer foam of Comparative Example 2. Increasing the mass ratio of the sodium benzoate from 2:98 in the hybrid nucleating agent A to 10:90 in the hybrid nucleating agent B further reduces the average cell diameter ($\varphi$) from the factor of about 5 in the Inventive Example 3 to a factor of about 6 (28.0/5.0) in the Inventive Example 4.

Comparing the cell densities ($N_f$) of the polymer foam of Inventive Example 3 versus the polymer foam of Reference Example 1 shows that use of the hybrid nucleating agent A amplifies the cell density ($N_f$) by a factor of about 17,483 (1.57E+09/8.98E+04). Increasing the mass of the sodium benzoate from 2:98 in the hybrid nucleating agent A to 10:90 in the hybrid nucleating agent B further amplifies the cell density ($N_f$) from the factor of about 17,483 in the Inventive Example 3 to a factor of about 32,628 (2.93E+09/8.98E+04) in the Inventive Example 4.

Surprisingly, the compounding of PET with the hybrid nucleating agents A and B also greatly amplifies the cell density ($N_f$) of the polymer foams, as compared to a polymer foam obtained by heterogeneous nucleation with a mineral nucleating agent ($CaSiO_3$) alone. The cell density ($N_f$) of the polymer foam of Inventive Example 3 is amplified by a factor of about 38 (1.57E+09/4.11E+07) relative to the cell density (N) of the polymer foam of Comparative Example 2. Increasing the mass ratio of the sodium benzoate from 2:98 in the hybrid nucleating agent A to 10:90 in the hybrid nucleating agent B further amplifies the cell density ($N_f$) from the factor of about 38 in the Inventive Example 3 to a factor of about 73 (2.98E+09/4.11E+07) in the Inventive Example 4.

Figure 4:
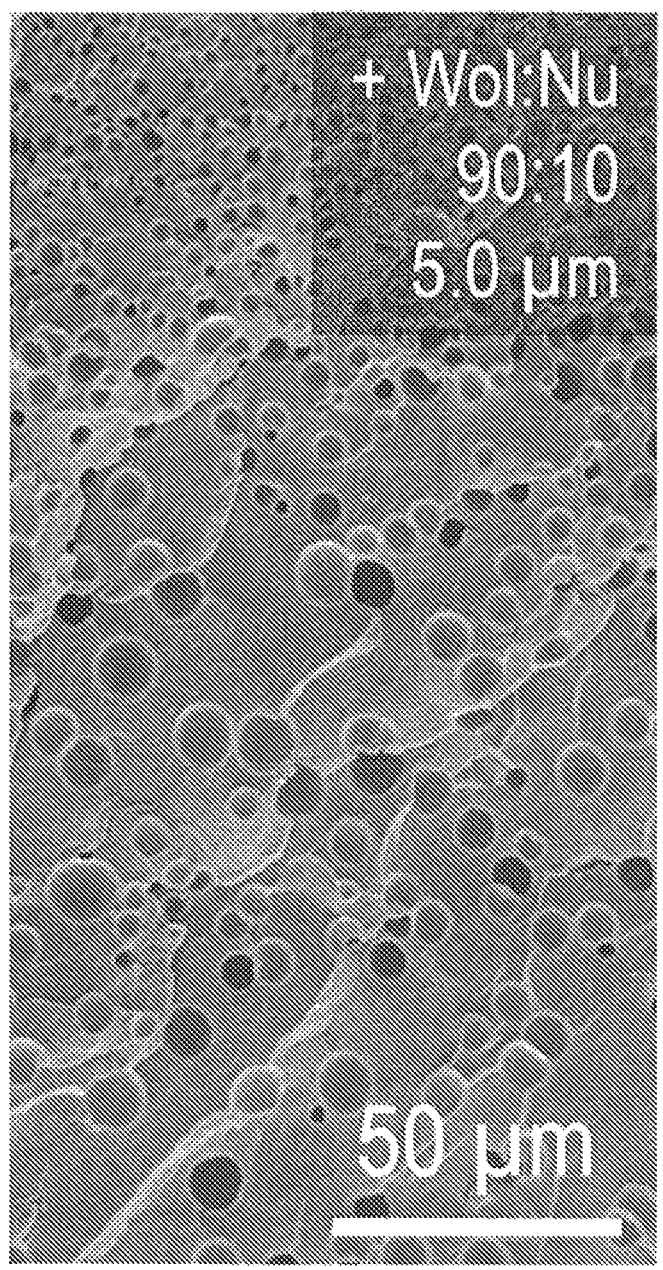
FIG. 4 is a SEM photograph showing the cross section of a polymer foam formed from PET in the presence of a hybrid nucleating agent at a mineral content of 1.0 wt. %, in which the hybrid nucleating agent is formed of sodium benzoate and Wollastonite in a mass ratio of 10:90.
Figure 5:
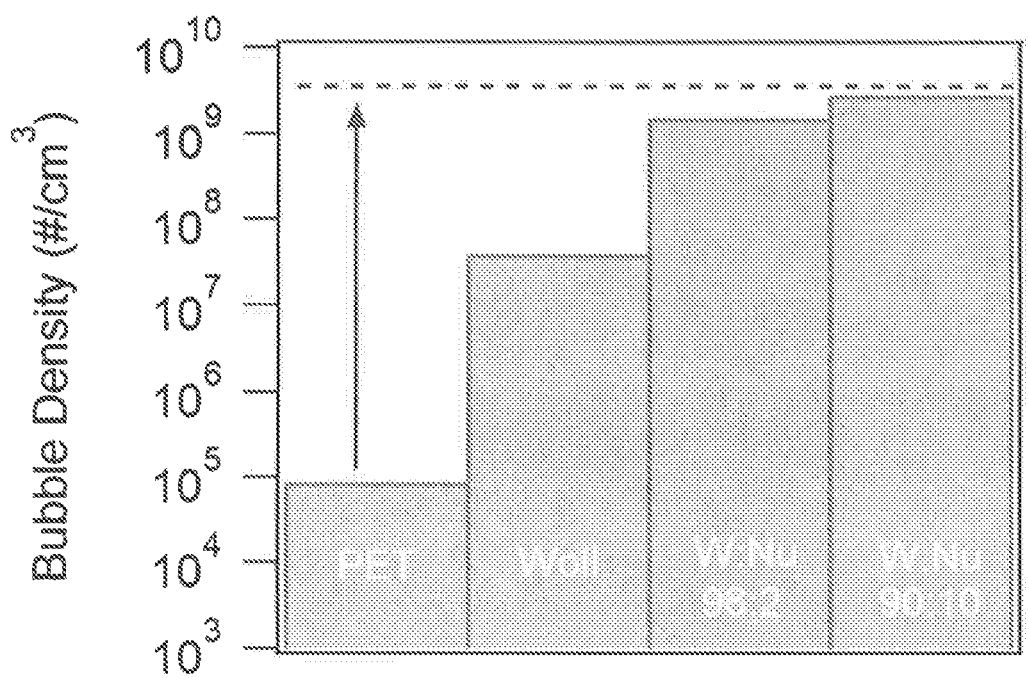
FIG. 5 is a chart depicting the bubble densities of PET polymer foams (i) foamed in the absence of any heterogeneous nucleating agent, (ii) foamed in the presence of Wollastonite, (iii) foamed in the presence of a hybrid nucleating agent formed of sodium benzoate and Wollastonite in a mass ratio of 98:2 at a mineral content of 1.0 wt. 5; and (iv) foamed in the presence of a hybrid nucleating agent formed of sodium benzoate and Wollastonite in a mass ratio of 90:10.

The cellular structures of the polymer foams of Reference Example 1, Comparative Example 2, Inventive Example 3 and Inventive Example 4 were studied using a HITACHI S-4300SE/N scanning electron microscope (SEM) from samples cryogenically fractured using liquid nitrogen and made conductive by sputter deposition of a thin layer of gold. These SEM images are depicted in FIG. 1 (Reference Example 1), FIG. 2 (Comparative Example 2), FIG. 3 (Inventive Example 3) and FIG. 4 (Inventive Example 4). FIG. 5 is a bar chart showing how the cell density ($N_f$) (cells/$cm^3$) of the polymer foams changes depending upon the presence of type of nucleating agent. The first (leftmost) bar shows the cell density of the polymer foam of Reference Example 1, the second bar shows the cell density of the polymer foam of Comparative Example 2, the third bar shows the cell density of the polymer foam of Inventive Example 3, and the fourth (rightmost) bar shows the cell density of the polymer foam of Inventive Example 4.

FIGS. 6a through 6c illustrate how the localization of an organic nucleating agent (sodium benzoate) on the surface of a mineral nucleating agent (wollastonite) alters the surface characteristics of the mineral nucleating agent (wollastonite). FIG. 6a is a SEM image of wollastonite showing, among other surface characteristics, distinctive lines running along the longitudinal axis of the mineral structure. FIG. 6b is a SEM image of the Hybrid Nucleating Agent A (used in Inventive Example 3) having a mass ratio of the sodium benzoate to the calcium silicate of 2:98. FIG. 6c is a SEM image of the Hybrid Nucleating Agent B (used in Inventive Example 4) having a mass ratio of the sodium benzoate to the calcium silicate of 10:90. As shown in FIGS. 6b and 6c, the lines running along the longitudinal axis of the wollastonite structure are greatly diminished in the Hybrid Nucleating Agents A and B.

The above description is presented to enable a person skilled in the art to make and use the invention, and is provided in the context of a particular application and its requirements. Various modifications to the embodiments disclosed herein will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the disclosure may not show every benefit of the invention, considered broadly.

What is claimed is:

1. A process of producing a polymer foam, the process comprising foaming a polymer in the presence of a hybrid nucleating agent, wherein the hybrid nucleating agent comprises an inorganic material and an organic nucleating agent coating at least a portion of the inorganic material;
    wherein the organic nucleating agent is at least one selected from the group consisting of aluminum dibenzoate, barium benzoate, barium stearate, benzylidene sorbitol, a derivative of benzylidene sorbitol, calcium benzoate, calcium montanate, calcium myristate, calcium octacosanoate, calcium oxalate, calcium stearate, erucic acid amide, ethylene bis-lauric acid amide, hydroxystearic acid amide, lithium benzoate, lithium dibenzoate, lithium stearate, lithium terephthalate, magnesium benzoate, magnesium stearate, 2,2-methylbis(4,6-di-tbutylphenyl)sodium, palmitic acid amide, potassium benzoate, potassium dibenzoate, potassium laurate, potassium myristate, potassium salicylate, potassium stearate, potassium terephthalate, sodium benzoate, sodium cyclohexane carboxylate, sodium laurate, sodium-2,2'-methylenebis(4,6-di-t-butylphenyl) phosphate, sodium montanate, sodium myristate, sodium βnaphthalate, sodium octacosanoate, sodium salicylate, sodium sulfoisophthalate, sodium stearate, sodium terephthalate, sodium p-toluene sulfonate, sodium toluoylate, stearic acid amide, tris(t-butylamide) trimesate and zinc salicylate.

2. The process of claim 1, wherein the inorganic material is at least one selected from the group consisting of a metal oxide, a metal silicate, a metal sulfate, a metal carbonate, an metal oxosulfate, a metal phosphate and a metal phosphonate.

3. The process of claim 1, wherein the inorganic material is at least one selected from the group consisting of a kaolin, a bentonite, a chloritic talc, a milled expanded perlite, a diatomite, a talc, a mica, a wollastonite, a titania and a silica.

4. The process of claim 1, wherein the polymer is a thermoplastic polymer or a thermoset polymer.

5. The process of claim 1, wherein the polymer comprises at least one selected from the group consisting of a polyolefin, a polyamide, a polycarbonate, a polyurethane, a polyester, a polyacrylate, and copolymers and blends thereof.

6. The process of claim 1, wherein the polymer comprises at least one selected from the group consisting of a polystyrene, a polyethylene, a polystyrene, a polyamide, a polyurethane, a poly(ethyl vinyl acetate), a polyethylene terephthalate, and copolymers and blends thereof.

7. The process of claim 1, wherein the foaming occurs in the presence of a chemical or physical blowing agent.

8. The process of claim 1, wherein the foaming occurs in the presence of a blowing agent is selected from the group consisting of water, an inert gas, carbon dioxide, and an organic gas.

9. The process of claim 1, wherein the hybrid nucleating agent is obtained by evaporating a dispersion of the organic nucleating agent and the inorganic material in a dispersion medium comprising at least two solvents.

10. The process of claim 9, wherein the dispersion medium is an aqueous dispersion medium comprising at least one organic solvent, such that a ratio of water to the at least one organic solvent ranges from 0.1:99.9 to 99.9:01.

11. The process of claim 1, further comprising:
melt-mixing the hybrid nucleating agent with the polymer, and extruding a resulting mixture to obtain a polymer-nucleating agent composite; and
foaming the polymer-nucleating agent composite with a physical blowing agent to obtain a polymer foam.

12. The process of claim 11, wherein the polymer foam has a cell density ($N_f$) of equal to or greater than about 1.5E+09 cells/cm$^3$, based on a volume of the polymer foam.

13. The process of claim 11, wherein the polymer foam has an average cell diameter ($\varphi$) of less than or equal to about 6.0 μm.

14. A foamed product obtained by the process of claim 1.

15. The foamed product of claim 14, wherein the foamed product has a cell density ($N_f$) of equal to or greater than about 1.5E+09 cells/cm$^3$, based on a volume of the foamed product.

16. The foamed product of claim 14, wherein the foamed product has an average cell diameter ($\varphi$) of less than or equal to about 6.0 μm.

17. The process of claim 1, further comprising forming the hybrid nucleating agent by:
dispersing the organic nucleating agent in a dispersing medium to obtain an additive dispersion, and
contacting the additive dispersion with the inorganic material, wherein the inorganic material comprises a mineral nucleating agent, to obtain the hybrid nucleating agent, such that the organic nucleating agent is localized on at least a portion of a surface of the mineral nucleating agent.

18. A process of producing a polymer foam, the process comprising foaming a polymer in the presence of a hybrid nucleating agent, wherein the hybrid nucleating agent comprises an inorganic material and an organic nucleating agent coating at least a portion of the inorganic material, wherein the process further comprises forming the hybrid nucleating agent by:
dispersing an organic nucleating agent in a dispersing medium to obtain an additive dispersion, and
contacting the additive dispersion with a mineral nucleating agent to obtain the hybrid nucleating agent, such that the organic nucleating agent is localized on at least a portion of a surface of the mineral nucleating agent wherein a mass ratio of the organic nucleating agent to the mineral nucleating agent ranges from about 0.1:99.9 to about 10:90.

19. A process of producing a polymer foam, the process comprising foaming a polymer in the presence of a hybrid nucleating agent, wherein the hybrid nucleating agent comprises wollastonite and an organic nucleating agent coating at least a portion of the wollastonite.

20. The process of claim 1, wherein the foaming occurs in the presence of a chemical or physical blowing agent.

* * * * *